United States Patent
Lee et al.

(10) Patent No.: US 12,210,699 B2
(45) Date of Patent: Jan. 28, 2025

(54) ELECTRONIC DEVICE INCLUDING POCKET CLIP STRUCTURE FOR SUPPORTING COMPONENT

(71) Applicant: Samsung Electronics Co., Ltd., Gyeonggi-do (KR)

(72) Inventors: Soohyun Lee, Gyeonggi-do (KR); Jaeshik Kim, Gyeonggi-do (KR); Sungjin Lee, Gyeonggi-do (KR); Jongchul Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/851,345

(22) Filed: Jun. 28, 2022

(65) Prior Publication Data

US 2023/0065568 A1 Mar. 2, 2023

Related U.S. Application Data

(63) Continuation of application No. PCT/KR2022/007181, filed on May 19, 2022.

(30) Foreign Application Priority Data

Sep. 1, 2021 (KR) .......... 10-2021-0116162
Sep. 24, 2021 (KR) .......... 10-2021-0126623

(51) Int. Cl.
*G06F 3/039* (2013.01)
*G06F 1/16* (2006.01)
*G06F 3/0354* (2013.01)

(52) U.S. Cl.
CPC ............ *G06F 3/039* (2013.01); *G06F 1/1607* (2013.01); *G06F 3/03545* (2013.01)

(58) Field of Classification Search
CPC ........ G06F 1/1607; G06F 1/1626; G06F 1/16; G06F 1/1656; G06F 3/0354; G06F 3/038;
(Continued)

(56) References Cited

U.S. PATENT DOCUMENTS 5,703,626 A * 12/1997 Itoh ................ G06F 3/03545
345/173
5,757,681 A * 5/1998 Suzuki ............ G06F 1/1616
361/679.1
(Continued)

FOREIGN PATENT DOCUMENTS

JP        2013-93002 A      5/2013
KR  10-2013-0021048 A      3/2013
(Continued)

OTHER PUBLICATIONS

International Search Report dated Aug. 31, 2022.
Extended European Search Report dated Oct. 22, 2024.

*Primary Examiner* — Nitin Patel
*Assistant Examiner* — Amen W Bogale
(74) *Attorney, Agent, or Firm* — Cha & Reiter, LLC

(57) ABSTRACT

According to an embodiment, an electronic device comprises: a housing including a through hole formed outside of the housing, and a seating part connected to the through hole, and the seating part accommodating insertion of an electronic pen through the through hole; a seating part cover surrounding at least of a part of the seating part; a cantilever disposed in the seating part, the cantilever including an elastic part extending to have a distance from the seating part cover that increases along an insertion direction of the electronic pen; wherein the cantilever includes a connection part connecting the seating part cover and the elastic part and a support part protruding from one surface of the elastic part (Continued)

facing the seating part cover and extending in a direction away from the connection part.

19 Claims, 17 Drawing Sheets

(58) Field of Classification Search
    CPC ............... G06F 3/03545; G06F 3/039; G06F 2200/1632
    See application file for complete search history.

(56) References Cited

U.S. PATENT DOCUMENTS

| | | | |
|---|---|---|---|
| 6,392,639 B1* | 5/2002 | Lee | G06F 1/1626 178/19.03 |
| 6,681,333 B1 | 1/2004 | Cho | |
| 9,152,181 B2 | 10/2015 | Lee et al. | |
| 10,180,738 B2 | 1/2019 | Tzou et al. | |
| 10,466,813 B2 | 11/2019 | Park et al. | |
| 10,809,821 B2 | 10/2020 | Kline et al. | |
| 2004/0042168 A1* | 3/2004 | Yang | G06F 1/1626 |
| 2006/0055686 A1* | 3/2006 | Lee | G06F 1/1626 345/179 |
| 2008/0029377 A1* | 2/2008 | Tsuduki | G06F 3/0338 200/533 |
| 2009/0114458 A1* | 5/2009 | Chen | G06F 1/1626 178/19.01 |
| 2009/0231306 A1 | 9/2009 | Tseng | |
| 2010/0165570 A1* | 7/2010 | Zuo | G06F 1/1626 361/679.58 |
| 2011/0148019 A1* | 6/2011 | Lin | G06F 3/03545 267/182 |
| 2011/0169784 A1 | 7/2011 | Yang et al. | |
| 2011/0310065 A1* | 12/2011 | Liang | G06F 1/1626 345/179 |
| 2012/0018336 A1* | 1/2012 | Liu | G06F 1/1656 206/488 |
| 2012/0127041 A1 | 5/2012 | Wang | |
| 2014/0077669 A1* | 3/2014 | Choi | H05K 5/0004 312/223.1 |
| 2015/0035809 A1* | 2/2015 | Kim | G06F 3/03545 345/179 |
| 2015/0156290 A1* | 6/2015 | Amit | H04M 1/026 345/179 |
| 2016/0190839 A1* | 6/2016 | Otsuka | G06F 1/266 320/115 |
| 2018/0299929 A1* | 10/2018 | Kim | G06F 1/1635 |
| 2023/0097723 A1* | 3/2023 | Wen | G06F 1/1607 361/679.02 |
| 2023/0213991 A1* | 7/2023 | Hsieh | G06F 1/1626 713/300 |

FOREIGN PATENT DOCUMENTS

| | | |
|---|---|---|
| KR | 10-2017-0033633 A | 3/2017 |
| KR | 10-2017-0054877 A | 5/2017 |
| KR | 10-2018-0013307 A | 2/2018 |
| KR | 10-1873054 B1 | 6/2018 |

* cited by examiner

ELECTRONIC DEVICE INCLUDING POCKET CLIP STRUCTURE FOR SUPPORTING COMPONENT

CROSS REFERENCE TO RELATED APPLICATION(S)

This application is a continuation of PCT International Patent Application No. PCT/KR2022/007181, which was filed on May 19, 2022, and claims priority to Korean Patent Application No. 10-2021-0116162 filed on Sep. 1, 2021, and Korean Patent Application No. 10-2021-0126623 filed on Sep. 24, 2021, in the Korean Intellectual Property Office, the disclosure of which are incorporated herein by reference in their entirety.

TECHNICAL FIELD

This disclosure relates to an electronic device including a pocket clip structure for supporting a component.

BACKGROUND

Various components may be disposed in the inner space of the housing of an electronic device. Some of the components may perform linear motion within designated range. A separate structure may be included so that the components perform a designated function according to a linear motion.

When contacting a part of the separate structures according to the linear motion of some of the components, or when the separate structures contact the partial components through a linear motion, the separate structures may support some of the components or pressurize some of the components.

As electronic devices become thinner, the separation distance between parts disposed in the inner space of the housing becomes narrow. It becomes increasingly difficult to arrange the parts in the inner space.

An electronic device including components performing various functions needs a method for securing a space for arranging parts in a narrow inner space of the electronic device.

The technical problems to be solved in this document are not limited to those described above, and other technical problems not mentioned herein will be clearly understood by those having ordinary knowledge in the art to which the present disclosure belongs, from the following description.

SUMMARY

According to an embodiment, an electronic device comprises: a housing including a through hole formed outside of the housing, and a seating part connected to the through hole, and the seating part accommodating insertion of an electronic pen through the through hole; a seating part cover surrounding at least of a part of the seating part; a cantilever disposed in the seating part, the cantilever including an elastic part extending to have a distance from the seating part cover that increases along an insertion direction of the electronic pen; wherein the cantilever includes a connection part connecting the seating part cover and the elastic part and a support part protruding from one surface of the elastic part facing the seating part cover and extending in a direction away from the connection part.

According to an embodiment, an electronic device, comprises: a housing; a component in the housing; a base in the housing; a connection part extending from one surface of the base in a first direction; an elastic part extending from the connecting part to have a distance from the base along a second direction different from the first direction; and a support part protruding from one surface of the elastic part toward the base; wherein the support part, contacts the base to apply a force to the component, when the component and the elastic part are in contact.

DETAILED DESCRIPTION

According to an embodiment, an electronic device includes a pocket clip structure. The pocket clip structure supports a component and can eliminate interference between components. This secures an arrangement space for the component through the pocket clip structure that includes a cantilever. The cantilever has elasticity, wherein the shape can be deformed by the force applied by an inserted part.

According to an embodiment, when the pocket clip structure is integrally formed with a cover surrounding a seating part on which the electronic pen is seated, components for fixing need not be separately provided when the electronic pen is accommodated, an electronic device including a pocket clip structure for supporting a component can achieve a reduction in manufacturing cost.

The effects that can be obtained from the present disclosure are not limited to those described above, and any other effects not mentioned herein will be clearly understood by those having ordinary knowledge in the art to which the present disclosure belongs, from the following description.

Figure 1:
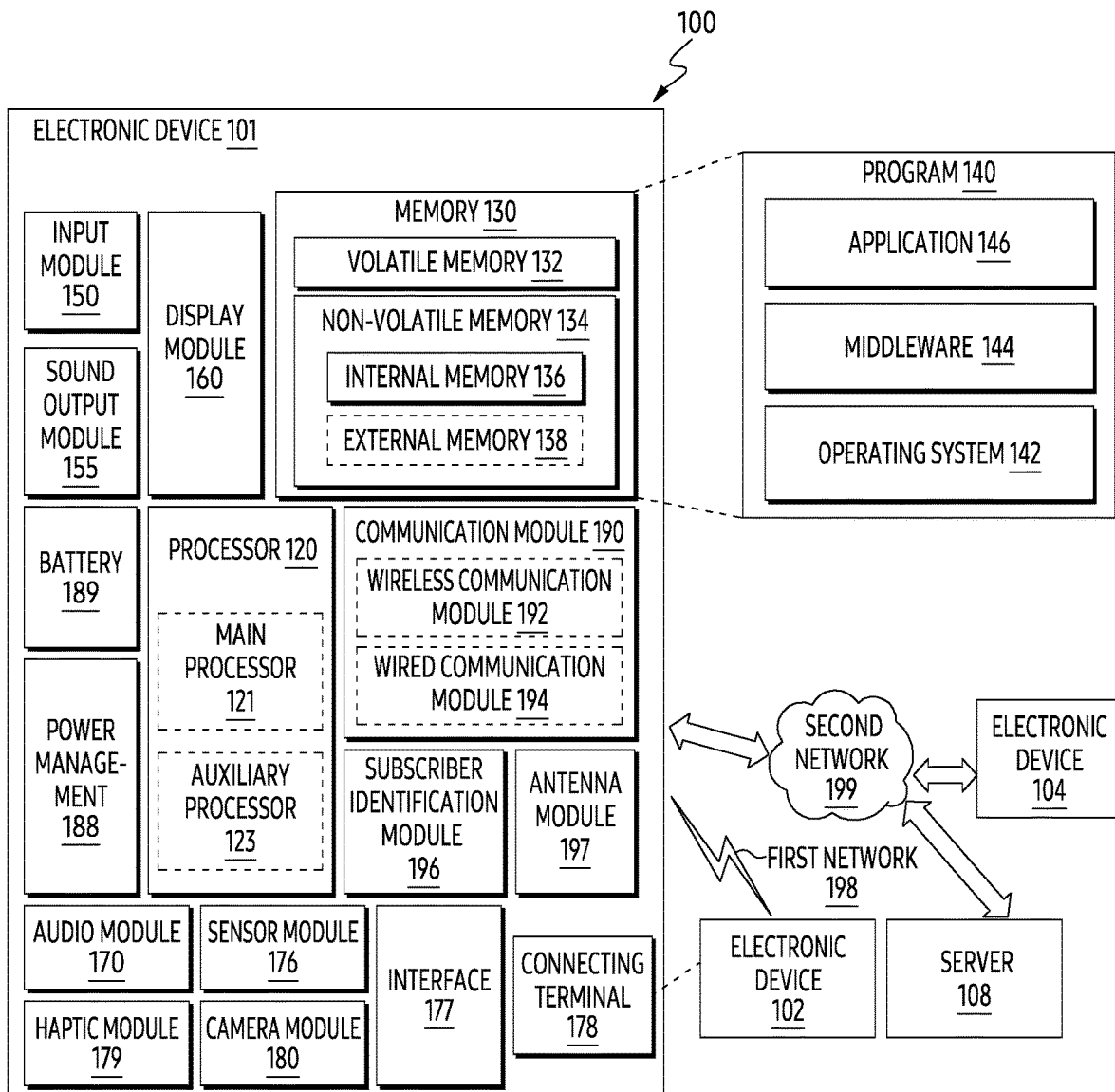
FIG. 1 is a block diagram of an electronic device in a network environment, according to an embodiment.

FIG. 1 is a block diagram of an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment of the disclosure, the electronic device 101 may communicate with the electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The term "processor" shall be understood to refer to both the singular and plural contexts in this document.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment of the disclosure, the interface 177 may include, for example, a high-definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to address, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to certain embodiments of the disclosure, the antenna module 197 may be a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or healthcare) based on 5G communication technology or IoT-related technology.

In certain embodiments, the electronic device 101 can include an electronic pen. The electronic pen can be used to provide inputs to the electronic device 101. For example, electronic device 101 includes a display module 160 that is touch sensitive. The user can provide an input by tapping the display module 160 or writing on the display module 160. The electronic device 101 includes a number of electronic components that are disposed inside the housing. It is also convenient to the user for the electronic device 101 to hold the electronic pen therein. However, the location to accommodate the electronic pen can be separated from the space accommodates electronic components, to prevent interference between the electronic components when the electronic pen is inserted and removed.

Figure 2:
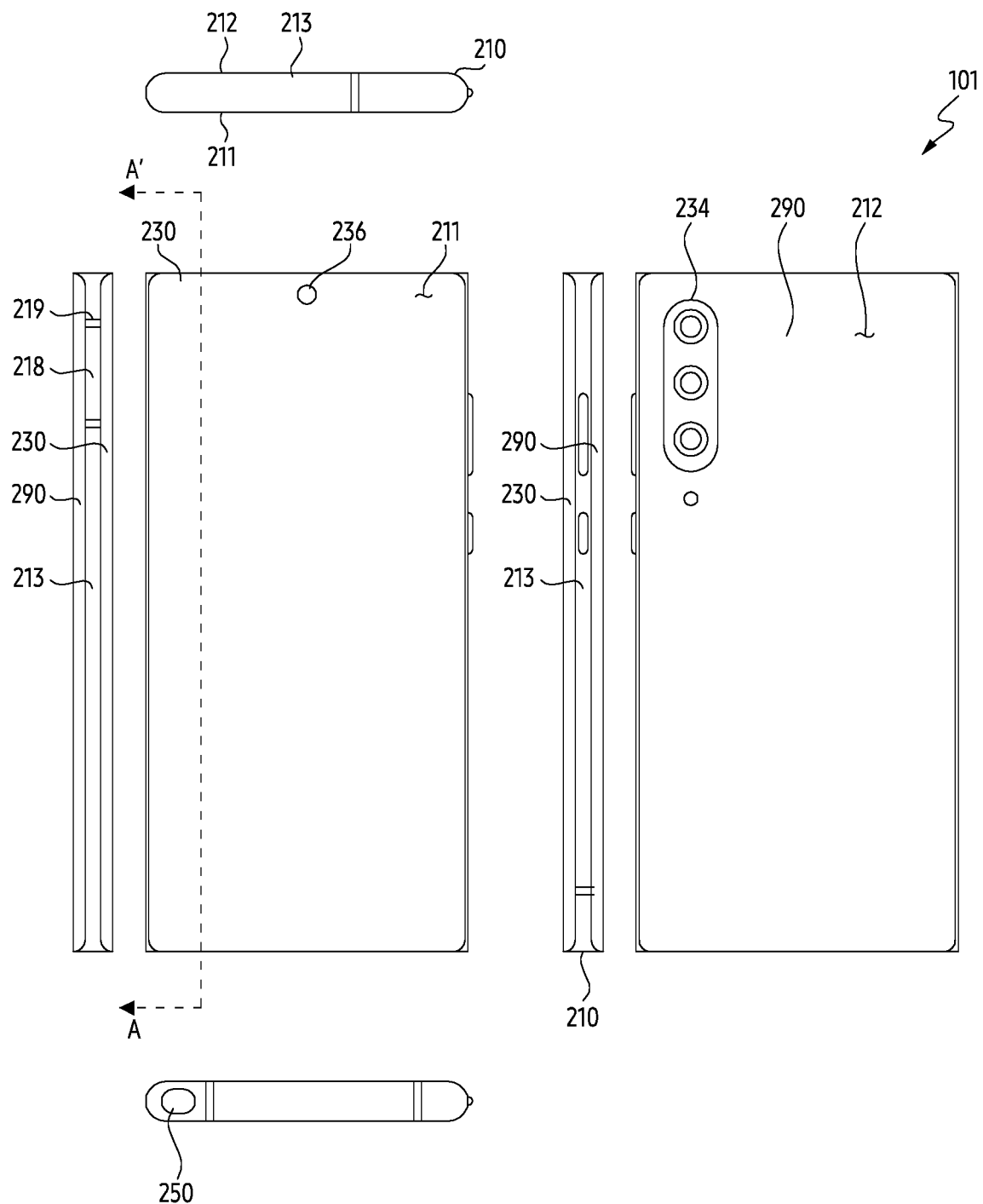
FIG. 2 illustrates the appearance of an electronic device according to an embodiment.

FIG. 2 illustrates the appearance of the electronic device 101 according to an embodiment. The electronic device 101 includes a housing 210. The housing 210 includes a rear plate 212 forming a rear surface and display 230 forming a front surface. The rear plate 212 and the display 230 surround a side surface 213. A portion of the space between the rear plate 212 and the display 230 hold electronic components, and another portion accommodates an electronic pen 250.

Referring to FIG. 2, the electronic device 101 may include a housing 210, a display 230, and an electronic pen 250.

The housing 210 may include a first surface 211 and a second surface 212 facing the first surface 211. The first surface 211 and the second surface 212 may be spaced apart from each other with a space, and the housing 210 may include a side surface 213 formed along at least a portion of peripheries of the first surface 211 and the second surface 212. In another embodiment, the housing may refer to a structure forming some of the first surface 211, the second surface 212, and the side surface 213 of FIG. 2.

In an embodiment, at least a portion of the first surface 211 may be formed by a substantially transparent front plate. The front plate formed on the first surface 211 may transmit visual information provided through the display 230 to the outside. The first surface 211 may include a glass plate or a polymer plate including various layers.

According to an embodiment, the second surface 212 may be formed by a substantially opaque rear plate 290. The rear plate 290 may be formed by coating or colored glass, ceramic, polymer, metal, or a combination of at least two of the above materials.

In an embodiment, the housing 210 may provide a space formed by the first surface 211, the second surface 212, and the side surface 213, as a space for disposing components of the electronic device 101. In an embodiment, the side surface 213 may include a conductive material, a non-conductive material, or a combination thereof. For example, the side surface 213 may include a conductive member 218 and a non-conductive member 219. The conductive member 218 may include a plurality of conductive members, and the plurality of conductive members may be spaced apart from each other. The non-conductive member 219 may be disposed between a plurality of conductive members. An antenna structure may be formed by a part or a combination of a plurality of conductive members and a plurality of non-conductive members.

According to an embodiment, the display 230 may form the first surface 211 of the housing 210. Display 230 may visually display information externally. The electronic device 101 may include a front camera module 236 on the first surface 211 on which the display 230 is disposed. The display 230 may form a recess or opening in a part of the screen display area of the display 230 and include a front camera module 236 aligned with the recess or the opening. According to an embodiment, the front camera module 236 may be disposed under the display 230, and at least a portion of the front camera module 236 may be covered by the display 230.

According to an embodiment, at least a portion of the camera module 234 (e.g., the camera module 180 of FIG. 1) and the flash 235 may be exposed through an opening formed in the second surface 212.

The camera module 234 may include cameras having different functions. For example, the camera module 234 may include at least one of a depth camera, a wide-angle camera, an ultra-wide-angle camera, and a telephoto camera.

The flash 235 may enhance light emitted or reflected from a subject for photographing at a low illuminance. The flash 235 may emit light toward the subject in order to enhance light emitted or reflected from the subject using at least one light emitting diode.

According to an embodiment, the electronic device 101 may further include an electronic pen 250. The electronic pen 250 may be inserted or detached by being guided into the inside of the housing 210 through a hole formed in the side of the housing 210 and include a button for facilitating detachment at the end. The electronic pen 250 may have a built-in separate resonance circuit and may be linked with an electromagnetic induction panel included in the display 230 of the electronic device 101. The electronic pen 250 may include an electro-magnetic resonance (EMR) method, an active electrical stylus (AES) method, and an electric coupled resonance (ECR) method.

The display 230 may include an electromagnetic induction panel. The electromagnetic induction panel (e.g., digitizer) may be a panel for detecting an input of the electronic pen 250. For example, the electromagnetic induction panel may include a printed circuit board (PCB) (e.g., a flexible printed circuit board (FPCB) and a shielding sheet. The shielding sheet may reduce interference between the components by an electromagnetic field generated from components included in the electronic device 101 (e.g., a display module, a printed circuit board, an electromagnetic induction panel, etc.). The shielding sheet may block the electromagnetic field generated from the components, so that the input from the electronic pen 250 is accurately transmitted to the coil included in the electromagnetic induction panel.

Figure 3:
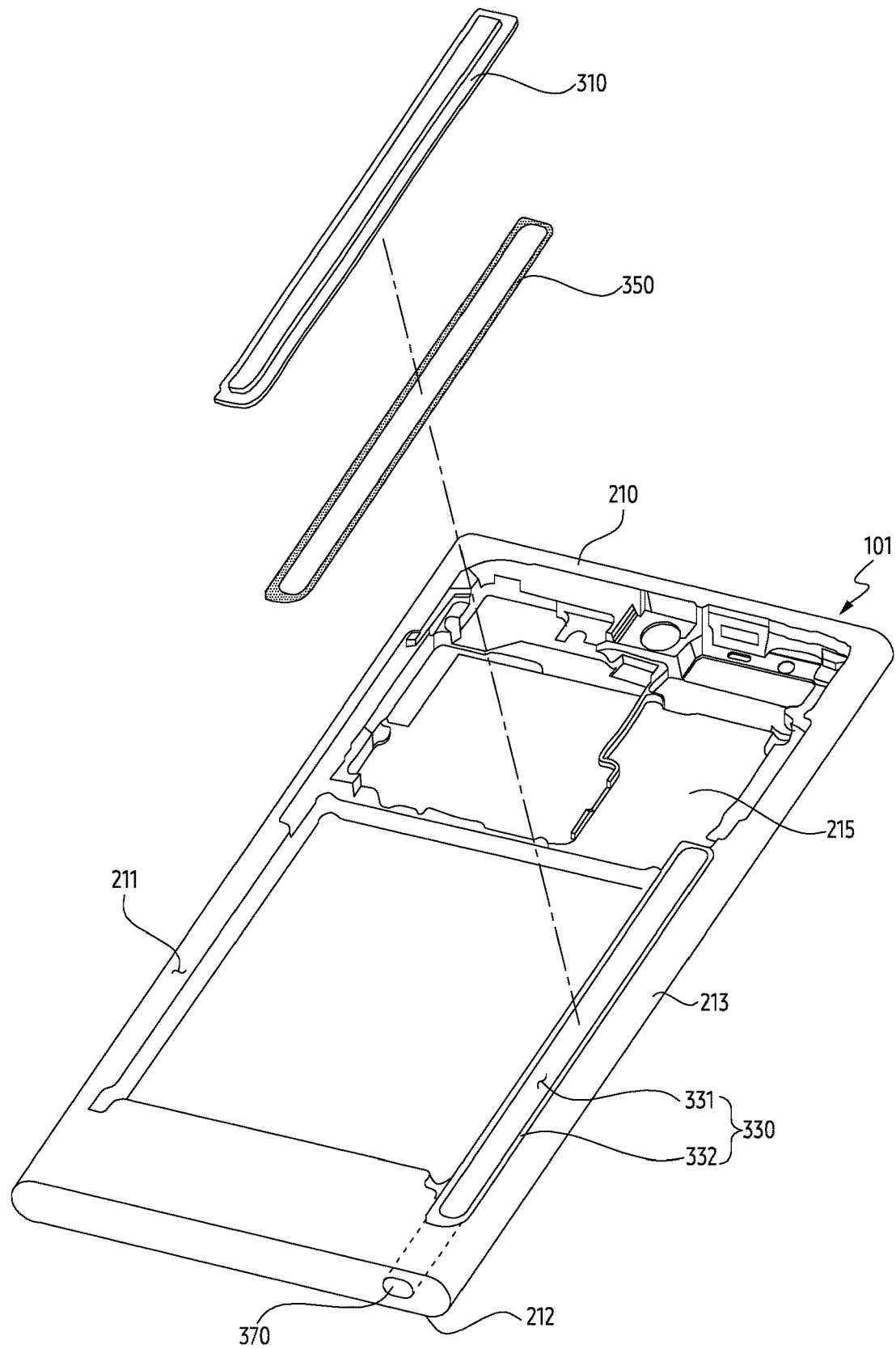
FIG. 3 is an exploded view illustrating a housing, a cover, and an adhesive tape of an electronic device according to an exemplary embodiment.

FIG. 3 is an exploded view illustrating a housing, a cover, and an adhesive tape of an electronic device according to an embodiment. The housing 210 includes a through hole 370 and a seating part 330. The seating part 330 is capable of accommodating an electronic pen. The user can insert the electronic pen through the through hole 370 to place the electronic pen into the seating part 330.

Referring to FIG. 3, the electronic device 101 may include a housing 210 and a seating part cover 310. The housing 210 may form an inner space in which components of the electronic device 101 may be disposed. The housing 210 may include a first surface 211, a second surface 212, and a side surface 213. The first surface 211, the second surface 212, and the side surface 213 may surround the inner space.

The first surface 211 may be a surface on which a display (e.g., the display 230 of FIG. 2) is disposed. The housing 210 may further include a support member 215 extending from the side surface 213 to support components of the electronic device 101. The support member 215 may be integrally formed with the side surface 213, but is not limited thereto. The support member 215 may be coupled to a part of the structure of the housing 210 forming the side surface 213, or may be supported by the structure.

The housing 210 may include a seating part 330 capable of accommodating an electronic pen (e.g., the electronic pen 250 of FIG. 2). The housing 210 may further include a through hole 370. The electronic pen 250 may be inserted into the electronic device 101 through the through hole 370.

The through hole 370 may be formed outside the electronic device 101. For example, the through hole 370 may be formed on the side surface 213 of the housing 210 and extend into the electronic device 101. The through hole 370 may be connected to the seating part 330, such that when an electronic pen is inserted through the through hole 370, the electronic pen enters the seating part 330.

The seating part 330 may be formed as a groove having a length. The seating part 330 may include a seating surface 331 on which the electronic pen 250 is seated and a sidewall 332 formed along peripheries of the seating surface. The sidewall 332 and the seating part cover 310 form the groove of the seating part 330. An area of the sidewall 332 in contact with the through hole 370 may be formed to connect the through hole 370 and the seating part 330. The through hole 370 and the seating part 330 may be integrally formed with the support member 215 of the housing 210. The electronic pen 250 may proceed to the seating part 330 through the through hole 370. For example, the electronic pen 250 may be inserted through the through hole 370 such that one end having a pen tip of the electronic pen 250 faces the inside of the housing 210. One end of the electronic pen 250 passing through the through hole 370 may be inserted to the end of the seating part 330, a part of the electronic pen 250 may be accommodated in the seating part 330, and the other part of the electronic pen 250 may be accommodated in the through hole 370.

The seating part 330 may be wrapped by the seating part cover 310. The seating part cover 310 may surround the electronic pen 250 disposed on the seating part 330. The seating part cover 310 may be referred to as a cover surrounding the seating part 330 for accommodating the electronic pen 250. For example, the seating part cover 310 may have a periphery corresponding to the shape of the sidewall 332 of the seating part 330. The periphery of the seating part cover 310 may be disposed on the sidewall 332 of the seating part 330 to surround the inner space of the seating part 330. The seating part cover 310 may prevent the electronic pen 250 disposed in the seating part 330 from being exposed to the outside of the seating part 330, as well as hold the electronic pen 250 in place.

The seating part cover 310 may be attached to the sidewall 332 of the seating part 330 by an adhesive member 350. The adhesive member 350 may fill a space between the seating part cover 310 and the seating part 330. The adhesive member 350 may be a waterproof tape. The adhesive member 350 may be disposed along the periphery of the seating part cover 310. According to an embodiment, the entire attachment surface of the adhesive member 350 may be attached to the seating part 330 and the seating part cover 310.

The adhesive member 350 absorbs moisture. When moisture flows in from the outside of the electronic device 101, moisture may flow into the seating part 330 through the through hole 370. The adhesive member 350, including a waterproof tape, may reduce the inflow of moisture introduced into the seating part 330 into the inner space of the housing 210 through the seating part 330. The seating part 330 may be isolated from the inner space of the housing 210 by the adhesive member 350 disposed along the periphery of the seating part cover 310 and attached to the sidewall of the seating part 330, thereby reducing movement of moisture introduced from the seating part 330 to the inner space of the housing 210.

The adhesive member 350 may be disposed between the seating part cover 310 and the seating part 330. For example, one surface of the adhesive member 350 may be attached to the seating part cover 310, and the other surface of the adhesive member 350 may be attached to a surface formed along the periphery of the seating part 330.

The electronic device may reduce the inflow of moisture into the housing 210 by the adhesive member 350 filling the space between the seating part 330 and the seating part cover 310. In order to reduce the inflow of moisture into the housing 210, a method capable of maintaining adhesion between the seating part cover 310 and the seating part 330 can be used. Hereinafter, a structure for maintaining adhesion between the seating part cover 310 and the seating part 330 will be described in detail.

Figure 4:
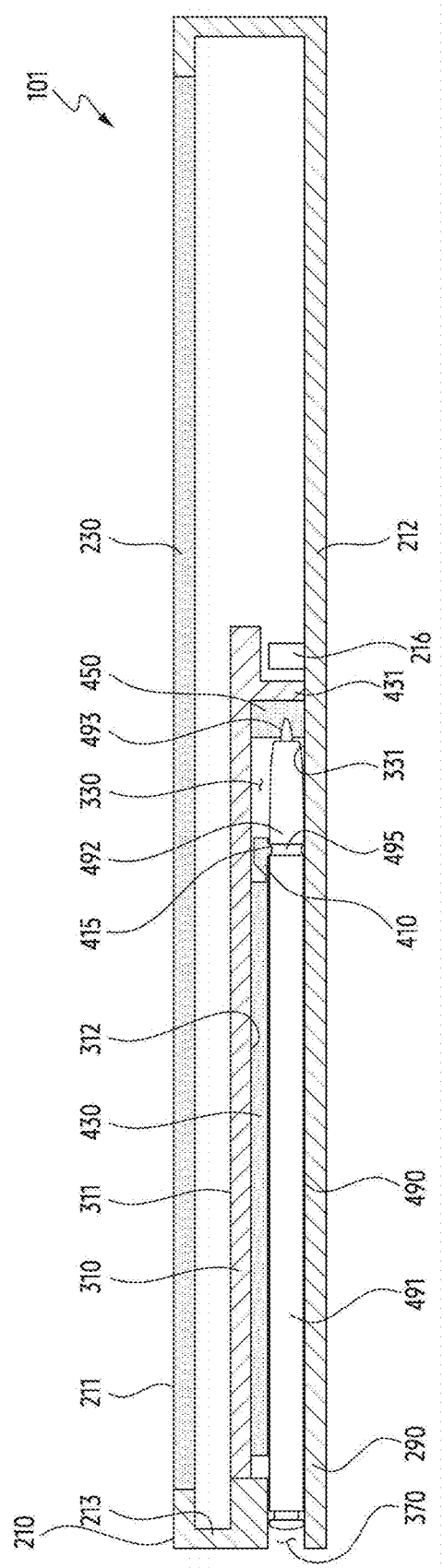
FIG. 4 is a section view of an electronic device cut along line A-A' of FIG. 2, according to an embodiment.
Figure 5:
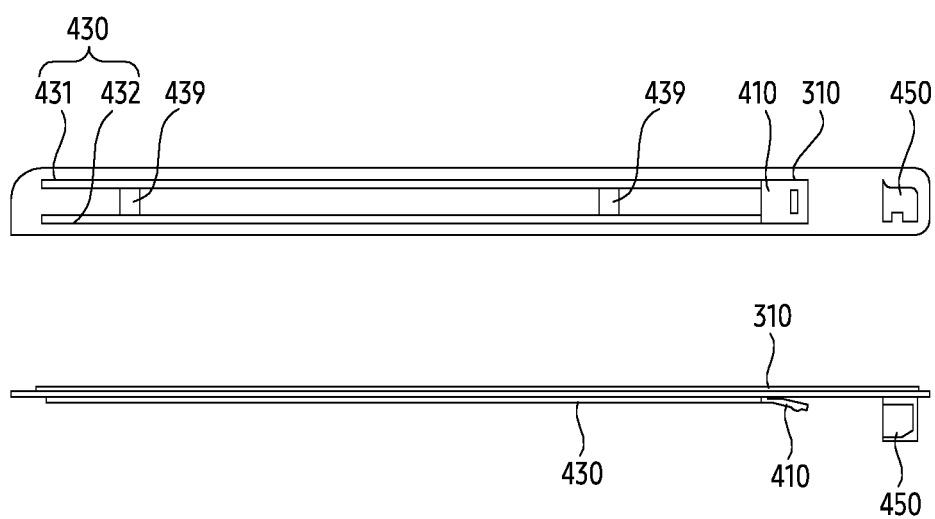
FIG. 5 illustrates a structure of a cover of an electronic device according to an embodiment.
Figure 6:
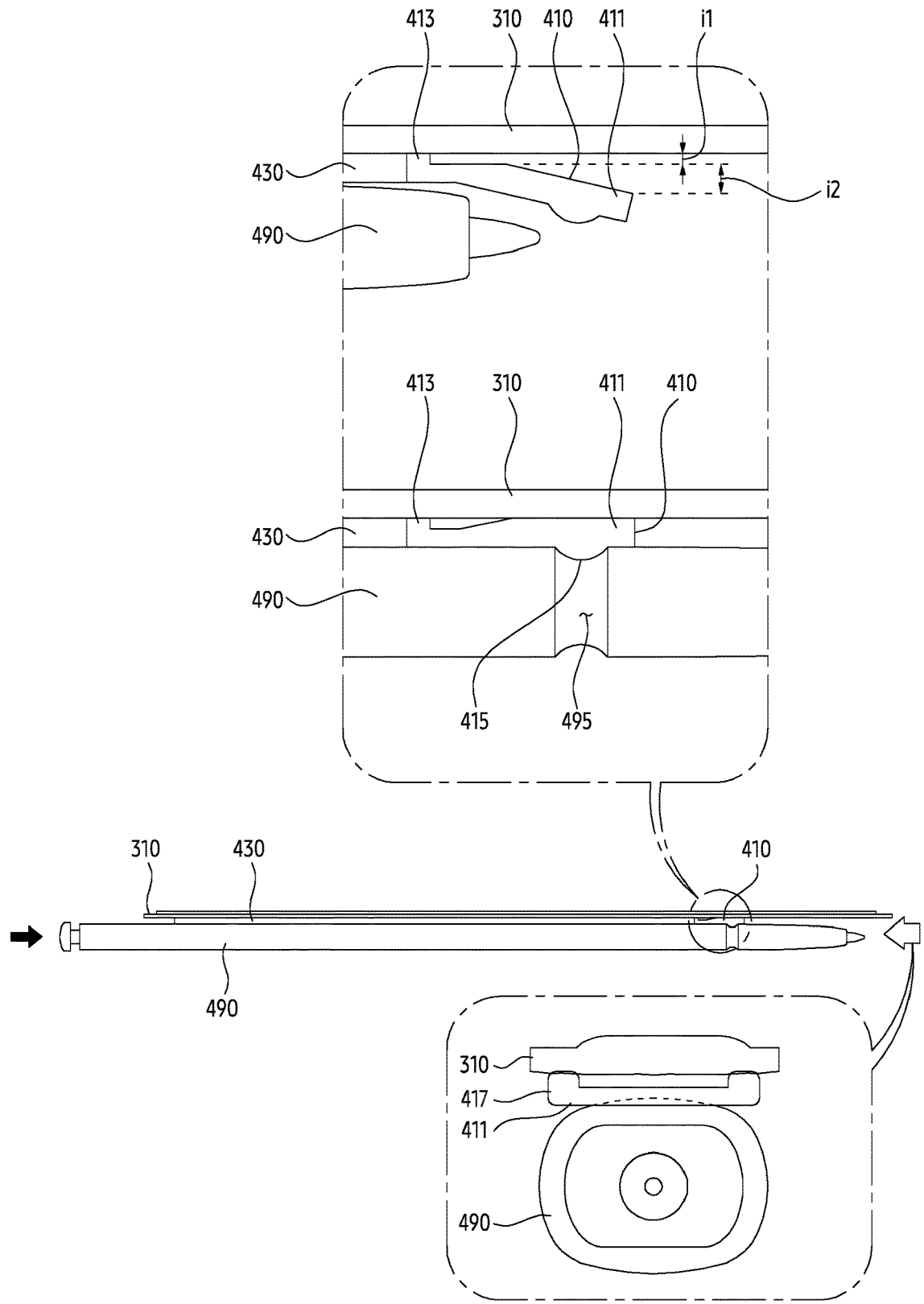
FIG. 6 illustrates an example of an operation of a cantilever that is deformed according to a pen inserted into an electronic device according to an embodiment.

FIG. 4 is a section view of an electronic device cut along line A-A' of FIG. 2, according to an embodiment, FIG. 5 illustrates a structure of a cover of an electronic device according to an embodiment, FIG. 6 illustrates an example of an operation of an cantilever that is deformed according to a pen inserted into an electronic device according to an embodiment.

Referring to FIG. 4, the electronic device 101 may include a housing 210, a seating part cover 310, and a cantilever 410.

The housing 210 may include a through hole 370 and a seating part 330. For example, the housing 210 may include a through hole 370 formed on an outer surface of the electronic device 101. The housing 210 can also include a seating part 330 connected to the through hole 370. The seating part can accommodate the electronic pen 490. The through hole 370 may pass through the instrument structure from the side surface 213 of the housing 210 toward the seating part 330. For example, the through hole 370 may pass through a portion of a support member (e.g., a bracket) that extends from the side surface 213 to be connected to the inner space of the housing 210. The through hole 370 may guide the electronic pen 490 to the seating part 330.

The seating part 330 may be formed in the support member of the housing 210 to have a groove. The groove can accommodate the electronic pen 490. The electronic pen 490 can be inserted through the through hole 370, and rest in contact with or be in close proximity to the through hole 370. The seating part 330 may be connected to the through hole 370 and may extend into the electronic device 101 along a direction in which the through hole 370 extends from the outside of the electronic device 101. The seating part 330 may be integrally formed with the through hole 370. For example, the housing 210 may include a groove formed in the seating part 330 and a support member 215 having a through hole 370 connected to the groove. The support member 215 may extend from the side surface 213 to support components (e.g., printed circuit boards, displays, batteries, etc.) of the electronic device 101. The support member 215 may form a seating part 330 including a groove (e.g., a groove 331 of FIG. 3) and a sidewall (e.g., a sidewall 332 of FIG. 3) surrounding at least a portion of the groove.

The seating part 330 may be disposed between the rear plate 290 forming the second surface 212 and the display 230 forming the first surface 211. Although the seating part 330 is illustrated as being in contact with the rear plate 290, it may be spaced apart from the rear plate 290.

A portion of the electronic pen 490 may be thinner toward the pen tip 493 than the remaining portion. For example, the electronic pen 490 may include a first area 491 having a first cross-sectional area and second area 492 having a second cross-sectional area that is less than the first cross-sectional area. The area in which the second cross-sectional area is located may include a periphery of the region in which the pen tip 493 is located. The cross-sectional area of the second region 492 may be substantially the same. For example, the second area 492 may include a fixing groove 495. The second region 492 may extend to have the same cross-sectional area in the remaining regions except for the region in which the fixing groove 495 is disposed. The seating part cover 310 can include a cantilever 410 extending from the seating cover 310. The electronic pen 490 may press the cantilever 410 when being inserted into the electronic device 101. When the electronic pen 490 is completely inserted into the electronic device 101, the cantilever 410 may fix the electronic pen 490 at a designated position in the housing 210. For example, the cantilever 410 may include a fixing protrusion 415. The fixing protrusion 415 may restrict the movement of the electronic pen 490 by insertion into the fixing groove 495 of the electronic pen 490.

Referring to FIGS. 4 and 5, the seating part cover 310 may have a shape corresponding to the shape of the seating part 330. The seating part cover 310 may be formed in a plate shape. The seating part cover 310 may be in contact with at least a portion of peripheries of the seating part 330. The seating part cover 310 may be bonded to the seating part 330 through an adhesive member (e.g., the adhesive member 350 of FIG. 3). The adhesive member 350 may be formed to fill a space between the seating part cover 310 and the seating part 330.

The seating part cover 310 may include a surface 312 facing the surface 311 facing the display 230. The surface 312 of seating part cover 310 may include a cantilever 410, a rail part 430, and a holder 450. According to an embodiment, the seating part cover 310 may be formed by double injection with the cantilever 410, the rail part 430, and the holder 450. The seating part cover 310 may include polycarbonate (PC), and the cantilever 410, the rail part 430, and the holder 450 may include a urethane material such as thermoplastic polyurethane (TPU). However, the present invention is not limited thereto, and the seating part cover 310, the cantilever 410, the rail part 430, and the holder 450 may be integrally formed. For example, the seating part cover 310, the cantilever 410, the rail part 430, and the holder 450 may be formed of a material having elasticity such as urethane and rubber.

The rail part 430 may guide the movement of the electronic pen 490 within the seating part 330. The rail part 430 may be formed on the surface 312 of the seating part cover 310, and may extend parallel to the periphery of the seating part cover 310 in the length direction along the length direction of the seating part cover 310. The rail part 430 may be formed of a plurality of rails. The rail part 430 may form an outer surface in a shape corresponding to an outer surface of the electronic pen 490. The rail part 430 may be in contact with a part of the electronic pen 490 while the electronic pen 490 is inserted, and when the electronic pen 490 is completely inserted into the electronic device 101, the rail part 430 may be spaced apart from the electronic pen 490.

The rail part 430 may include a first rail 431 and a second rail 432. Each of the first rail 431 and the second rail 432 may support at least a part of the electronic pen 490. The first rail 431 may be spaced apart from the second rail 432. The first rail 431 may be parallel to the second rail 432. The first rail 431 and the second rail 432 may extend along the insertion direction of the electronic pen 490 from a region including one end of the seating part cover 310. The first rail 431 may be spaced apart from one of peripheries of the seating part cover 310 extending in the insertion direction of the electronic pen 490. The second rail 432 may be spaced apart from another periphery distinguished from the one periphery among peripheries of the seating part cover 310 extending along the insertion direction of the electronic pen

490. A distance between the first rail 431 and the one periphery may be the same as a distance between the second rail 432 and the other periphery.

The rail part 430 may further include a reinforcing member 439. The reinforcing member 439 may be disposed between the first rail 431 and the second rail 432. The reinforcing member 439 may be configured to maintain a separation distance between the first rail 431 and the second rail 432. The reinforcing member 439 may support the first rail 431 and the second rail 432 by connecting the first rail 431 and the second rail 432. A plurality of reinforcing members 439 may be disposed to prevent deformation of the first rail 431 and the second rail 432. For example, one reinforcing member 439 may be disposed in an area close to one end of the first rail 431 and the second rail 432, and the other reinforcing member 439 may be disposed in an area close to the other end of the first rail 431 and the second rail 432.

The cantilever 410 may be in contact with one end of the rail part 430. The rail part 430 may extend to one end of the cantilever 410 and may be connected to a part of the cantilever 410. The cantilever 410 may be referred to as a clip member or a pocket clip.

The cantilever 410 may press and fix the electronic pen 490 when the electronic pen 490 is completely inserted into the electronic device 101. The cantilever 410 may fix the electronic pen 490 by pressing the electronic pen 490 through the other part of the cantilever 410. The other part of the cantilever 410 is in contact with the electronic pen 490 while being supported by one surface of the seating part cover 310. For example, the cantilever 410 may include a fixing protrusion 415. The fixing protrusion 415 can be inserted into the fixing groove 495 of the electronic pen 490 to fix the electronic pen 490. When the electronic pen 490 is inserted, the cantilever 410 may fix the electronic pen 490 through insertion of the fixing protrusion 415 into the fixing groove 495.

The holder 450 may be disposed at one end of the seating part cover 310. The holder 450 may be disposed between the surface 312 of the seating part cover 310 and the seating surface 331 of the seating part 330. The holder 450 may protect the pen tip 493 of the electronic pen 490 and may contact one end of the electronic pen 490.

The holder 450 may protect the pen tip 493 and support the electronic pen 490 by accommodating at least a portion of the pen tip 493 of the electronic pen 490. The electronic pen 490 may be supported by the holder 450 by inserting a pen tip 493 into the holder 450. The electronic pen 490 supported by the holder 450 may be spaced apart from the rail part 430 and may be spaced apart from the seating surface 331. The electronic pen 490 may be inserted into the electronic device 101 and supported by the holder 450 so that the electronic pen 490 may be disposed to be spaced apart from the through hole 370. The circumference of the electronic pen 490 and the periphery of the through hole 370 may be spaced apart by substantially same distance.

One end of the seating part cover 310 on which the holder 450 is disposed may surround a part of the holder 450. According to an embodiment, the other surface of the holder 450 facing one surface of the holder 450 in contact with the electronic pen and the part of the seating part cover 310 disposed between the instruments forming the seating part 330 may fasten the holder 450 to the seating part 330. For example, the seating part cover 310 may extend in the first direction to cover one surface of the holder 450. The holder 450 may be supported by an extension part 316 extending from one end of the seating part cover 310. The extension part 316 may extend in a second direction perpendicular to the first direction of the housing 210. The holder 450 may be integrally formed with the extension part 316. For example, the seating part cover 310 may extend from the through hole 370 to an area where the holder 450 is disposed. The holder 450 may include an extension part 316 spaced apart from the instrument 216 protruding from one surface of the support member (e.g., the support member 215 of FIG. 3). The extension part 316 extending toward the second surface of the seating part cover 310 may be disposed between the holder 450 and the instrument 216. The extension part 316 may support the holder 450 and may be fastened and fixed to the instrument 216. The extension part 316 may be formed of a material having rigidity. The extension part 316 may include a polycarbonate material and may be injected together with the seating part cover 310. For example, through double injection, the extension part 316 may be formed to be attached to the holder 450 formed of urethane. The holder 450 may include an extension part 316 having rigidity or may be attached to the extension part 316 to enhance a fastening force with the instrument 216.

In FIG. 6, the cantilever 410 may include an elastic part 411 and a connection part 413. The elastic part 411 can be deformed by the shape of the electronic pen 490 as the electronic pen 490 is inserted into the through hole. When the fixing groove 415 of the electronic pen 490 passes elastic part 411, the elastic part 411 expands from its deformed shape to insert into the fixing groove 415, thereby fixing the electronic pen 490 in place.

Referring to FIG. 6, the electronic pen 490 may be inserted into the electronic device (e.g., the electronic device 101 of FIG. 1) along the rail part 430. The rail part 430 may be formed by being attached to the seating part cover 310. For example, the rail part 430 may extend along one surface of the seating part cover 310, and a cantilever 410 may be attached to an end of the rail part 430. A part of the cantilever 410 may be spaced apart from the seating part cover 310. For example, the cantilever 410 may extend to have a distance from the seating part cover 310 that increases along the insertion direction of the electronic pen 490. The cantilever 410 may include an elastic part 411 and a connection part 413.

The cantilever 410 may include an elastic part 411 and a connection part 413. The elastic part 411 may be deformed by elasticity. The elastic part 411 forms most of the cantilever 410 and may rotate toward the seating part cover 310 according to the insertion of the electronic pen 490.

The electronic pen 490 may move toward the cantilever 410 along the rail part 430. The elastic part 411 of the cantilever 410 may be connected to the seating part cover 310 through a connection part 413. The connection part 413 may support the elastic part 411 and may separate the elastic part 411 from the seating part cover 310. The connection part 413 may be in contact with the end of the rail part 430 to reinforce the rigidity of the cantilever 410. According to an embodiment, the cantilever 410 including the connection part 413 may be integrally formed with the rail part 430.

When the electronic pen 490 is removed from the electronic device 101, or only a part of the electronic pen 490 is inserted so that the electronic pen 490 and the cantilever 410 do not contact each other, the cantilever 410 may be inclined and extend with respect to the seating part cover 310. When the electronic pen 490 and the cantilever 410 are not in contact with each other, the cantilever 410 may extend to have an increasing distance from the seating part cover 310 along the insertion direction of the electronic pen. For example, the distance $i1$ between the cover and the point where the elastic part 411 of the cantilever 410 has a slope with respect to the seating part cover 310 may be smaller than the distance i2 between the free end of the cantilever 410 and the seating part cover 310. Along the insertion direction of the electronic pen 490, the distance between the elastic part 411 of the cantilever 410 and the seating part cover 310 may increase from the distance i1 to the distance i2.

When the electronic pen 490 starts to be inserted into the electronic device 101, and the electronic pen 490 starts to contact a part of the cantilever 410, the cantilever 410 may be elastically deformed toward the seating part cover 310 to reduce a gap between the seating part cover 310 and the cantilever 410.

When the electronic pen 490 is completely inserted into the electronic device 101, the electronic pen 490 may be fixed by deformation of the elastic part 411. The appearance of the cantilever 410 may be changed according to the insertion of the electronic pen 490. While the electronic pen 490 is inserted into the housing, the cantilever 410 may be supported by one surface of the seating part cover 310 in contact with a part of the cantilever and press the electronic pen 490 through an elastic part 411 in contact with the electronic pen 490. The electronic pen 490 may be fixed by pressing the elastic part 411. According to an embodiment, the cantilever 410 may further include a support part 417 protruding from the elastic part 411 toward the seating part cover 310. In a state in which the electronic pen 490 is inserted into the electronic device 101, the support part 417 may contact the seating part cover 310. The support part 417 in contact with the seating part cover 310 may form an empty space together with the seating part cover 310 and the elastic part 411. For example, the empty space may be surrounded by a support part 417, a seating part cover 310, and an elastic part 411. The empty space may provide a margin in which the elastic part 411 pressed by the electronic pen 490 may be deformed.

The electronic pen 490 may further have a fixing groove 495, and the cantilever 410 may further have a fixing protrusion 415 corresponding to the fixing groove 495. The fixing protrusion 415 may be fitted into a fixing groove 495 formed in the electronic pen 490 when the electronic pen 490 is completely inserted into the housing 210, and a fixing protrusion may be formed on one surface of the elastic part 411 facing the seating part 330. When the electronic pen 490 is completely inserted into the housing 210, the fixing protrusion 415 may be disposed in an area on one surface of the elastic part 411 corresponding to a position capable of engaging the fixing groove 495 of the electronic pen 490. The outer surface of the fixing protrusion 415 may be formed as an outer surface corresponding to the outer surface of the fixing groove 495 formed on the outer surface of the electronic pen 490.

The electronic device 101 may integrally form the seating part cover 310 with the cantilever 410, the holder 450, or both. For example, the seating part cover 310 may be integrally formed with the cantilever 410 that presses the electronic pen 490 inserted into the electronic device 101. As another example, the electronic device 101 may elastically support the electronic pen 490 and may integrally form the holder 450 and the seating part cover 310 protecting the end of the electronic pen 490. As another example, the electronic device 101 may integrally form the cantilever 410, the holder 450, and the seating part cover 310. When the seating part cover 310 and a portion requiring elasticity are formed by double injection, manufacturing time of the seating part cover 310 and other members may be reduced, and cost may be reduced.

The seating part cover 310 may integrally form the holder 450 and the cantilever 410 of the same material. The seating part cover 310, the holder 450, and the cantilever 410 may be formed of rubber or urethane, and the seating part 330 and the seating part cover 310 may be adhered to an adhesive member 350, which is a waterproof tape, to ensure waterproof performance.

Although the cover including the cantilever according to an embodiment is described as being applied to an electronic device that is not deformed, the present invention is not limited thereto, and may be applied to a deformable device such as a foldable device or a rollable device.

The cantilever may be a case of an electronic device in which a pen is embedded. For example, when a pen is inserted, the electronic device case may include a cantilever disposed on the seating part of the electronic pen to fix the electronic pen.

According to the above-described embodiment, the cantilever 410 and the seating part cover 310 may be formed by double injection. When the elastic part 411 on which the fixing protrusion 415 is formed is attached to the seating part cover 310 to be formed, it may be difficult to secure a thickness of a mold for forming a space surrounded by the surface and the support part of the elastic part 411. In order to secure the thickness of the mold, when the separation distance between the elastic part 411 and the seating part cover 310 is increased, the overall thickness of the electronic device 101 may increase. In order to secure the thickness of the mold, when the thickness of the seating part cover 310 is made thin, it may be difficult to secure waterproof performance between the seating part cover 310 and the seating part 330.

The cantilever 410 is formed to be in contact with the connection part 413 and to increase the distance from the seating part cover 310 toward the other end. This ensures a manufacturing thickness of the mold and elasticity. By not modifying the structure of the seating part cover 310, waterproof performance of the electronic device 101 may be secured.

According to the above-described embodiment, the electronic device 101 may reduce an opening formed in the seating part 330 by a locker disposed in an outer space of the seating part 330 by configuring a locking device such as a locker as an cantilever 410 and attaching it to the seating part cover 310. The mounting part 330 may be an instrument structure disposed inside the electronic device 101, and an opening formed in the seating part 330 may degrade rigidity of the instrument structure.

According to an embodiment, the cantilever 410 does not require an opening in the instrument structure, thereby securing the rigidity of the metal. Due to the reduction of the opening, the arrangement structure of the waterproof tape between the seating part 330 and the seating part cover 310 may be simplified, and thus, it may be advantageous in securing waterproof performance. Since the cantilever 410 is attached to the seating part cover 310 and is disposed inside the seating part 330, an arrangement space may be secured. According to an embodiment, the seating part cover 310 may be formed by double injection without separately including the cantilever 410 and the holder 450, thereby shortening manufacturing time and reducing cost.

Figure 7:
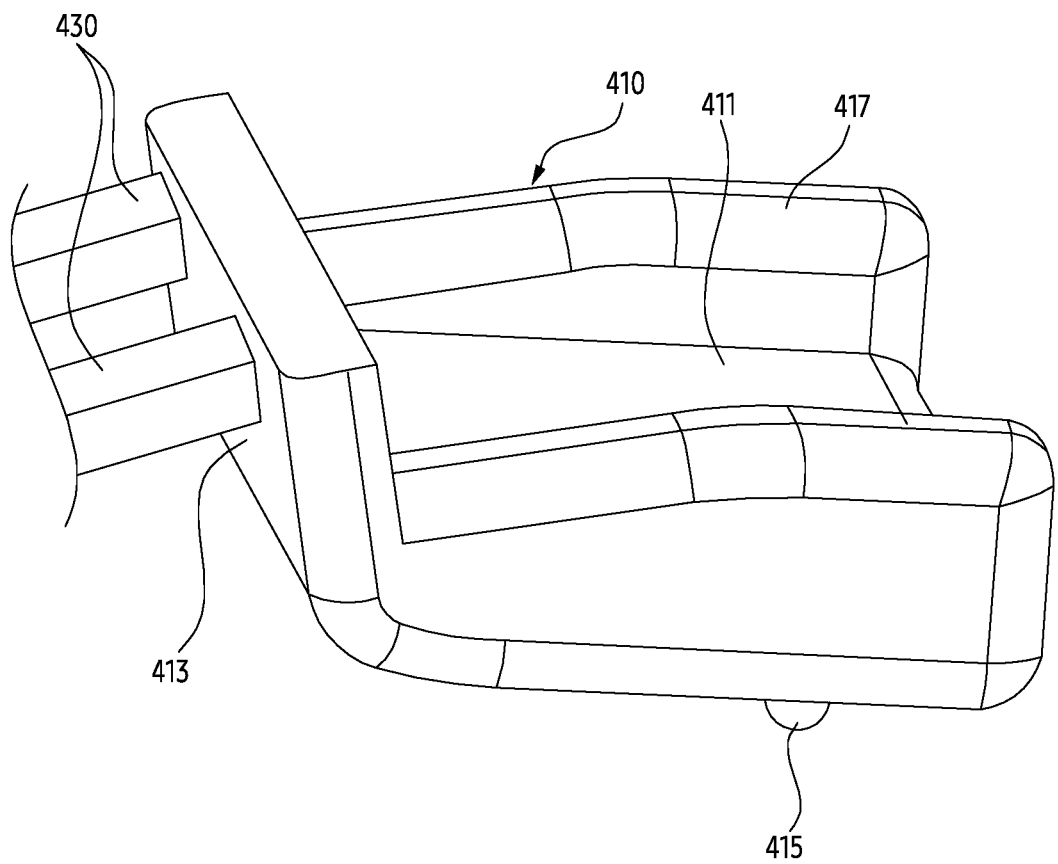
FIG. 7 illustrates a structure of a cantilever of an electronic device according to an embodiment.
Figure 8:
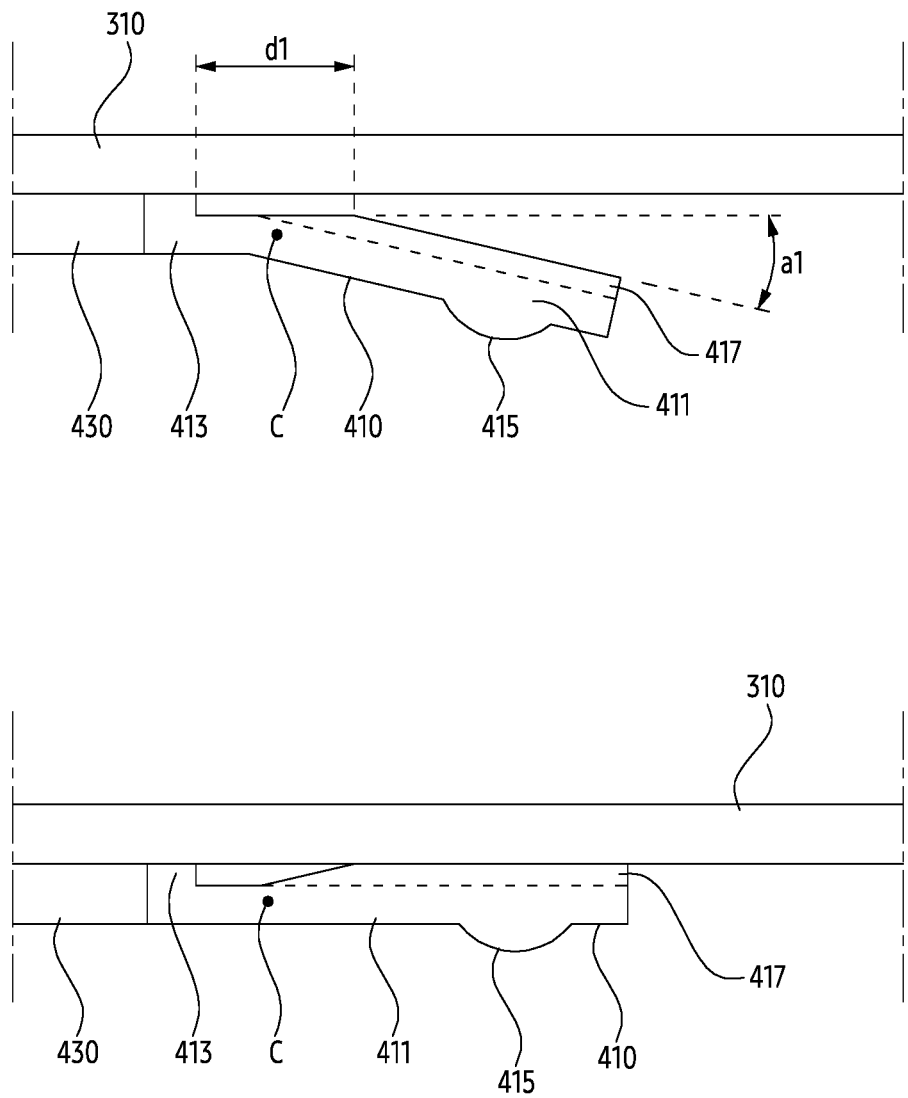
FIG. 8 illustrates a modified example of a cantilever structure of an electronic device according to an embodiment.

FIG. 7 shows a structure of a cantilever of an electronic device according to an embodiment, and FIG. 8 shows a modified example of a cantilever structure of an electronic device according to an embodiment.

Referring to FIGS. 7 and 8, the cantilever 410 may include an elastic part 411, a connection part 413, a fixing protrusion 415, and a support part 417. The elastic part 411 may have one end connected to the connection part 413 and may have a slope with respect to a cover (e.g., the seating part cover 310 of FIG. 3) toward the other end. The surface of the elastic part 411 may be deformed by a force applied to the elastic part 411 from the outside.

The connection part 413 may extend from the seating part cover 310 to contact the elastic part 411. The connection part 413 may support the elastic part 411. By coupling the elastic part 411 and the connection part 413, one end of the elastic part 411 coupled to the connection part 413 may be elastically supported, and the other end of the elastic part 411 may be a free end without a support member. The cantilever 410 may be formed of an elastic material and depending on the external force applied to the cantilever 410, the cantilever 410 may be deformed and restored to original state.

A member for supporting the connection part 413 of the cantilever 410 may be added to a surface facing the surface in contact with the elastic part 411. When the cantilever 410 rotates toward the seating part cover 310, the connection part 413 may be pushed toward the elastic part 411 and when the cantilever 410 is spaced apart from the seating part cover 310, the connection part 413 may be pushed in a direction opposite to a direction toward the elastic part 411. According to an embodiment, in a state in which the connection part 413 is not coupled to the elastic part 411, when the electronic pen (e.g., the electronic pen 490 of FIG. 4) is inserted into the electronic device 101, the elastic part 411 may move in the insertion direction of the electronic pen 490. When the electronic pen 490 is removed, the elastic part 411 may move in the removal direction of the electronic pen 490.

According to an embodiment, in order to prevent the flow of the elastic part 411, the cantilever 410 may arrange an end portion of the rail part 430 on the other surface of the connection part 413 facing one surface from which the elastic part 411 extends. The connection part 413 and the rail part 430 are coupled to each other by a method such as coupling or adhesion, so that the rail part 430 may prevent movement of the connection part 413. According to an embodiment, the connection part 413 and the rail part 430 may be integrally formed. For example, the cantilever 410 may be integrally formed with the connection part 413 and may be formed in one process. The seating part cover 310 may be formed of a PC material, and the cantilever 410 including the rail part 430 and the connection part 413 may be formed of a urethane material such as a TPU. The seating part cover 310, the rail part 430, and the cantilever 410 may be formed through double injection. Through the double injection process, the rail part 430 and the cantilever 410 may be integrally formed. The connection part 413 and the rail part 430 are integrally formed, so that the rail part 430 may prevent the connection part 413 from flowing. For example, while the electronic pen 490 is inserted into the electronic device 101, or the electronic pen 490 is removed from the housing 210, the connection part 413 may prevent movement in the moving direction of the electronic pen 490 by coupling with the rail part 430.

According to an embodiment, by coupling with the rail part 430, in the connection part 413, the rotation center of the elastic part 411 may not be located at the connection part 413 but a rotation center may be formed at a position c spaced apart from the connection part 413. When not coupled to the rail part 430, the rotation center may be formed on the connection part 413. Since the connection part 413 supports the elastic part 411, in a state where the stress is concentrated, when the center of rotation is located, the possibility of damage due to frequent deformation of the connection part 413 may increase. The rigidity of the connection part 413 may be reinforced by an arrangement in which the connection part 413 and the rail part 430 face each other. By coupling the connection part 413 and the rail part 430, a rotation center may be positioned in the elastic part 411 where stress concentration is relatively less generated.

The distance between the elastic part 411 of the cantilever 410 and the seating part cover 310 may have a designated slope. For example, the angle a1 between the elastic part 411 and the seating part cover 310 may be maintained at 15 degrees to 20 degrees. According to an embodiment, the angle a1 may be set to an angle capable of preventing excessive deformation of the elastic part 411 without interfering with insertion of the electronic pen 490. When the angle a1 is formed within 15 degrees, it is difficult to secure the thickness of the core of the mold for double injection and when the angle a1 is formed to be greater than or equal to 20 degrees, when the electronic pen 490 is inserted into the seating part 330, the cantilever 410 may interfere with the movement of the electronic pen 490. When the angle a1 is formed to be greater than or equal to 20 degrees, the cantilever 410 may be excessively deformed.

According to an embodiment, the support part 417 of the cantilever 410 may protrude from one surface of the elastic part 411 facing the cover and may be formed in a direction away from the connection part 413. The support part 417 may be formed along a periphery of the elastic part 411. The elastic part 411 may include a plurality of peripheries, and one periphery may be connected to the connection part 413. The support part 417 may include two support members formed along peripheries contacting both ends of the one periphery of the elastic part 411.

The support part 417 may be formed to be spaced apart from the connection part 413 by a distance of d1. The d1 may be determined in consideration of the thickness of the mold for fabricating the cantilever and may be formed to have a length suitable for implementing the function of the cantilever 410. The d1 may be equal to or greater than the minimum distance that may be formed into a mold.

When the electronic pen 490 is completely inserted into the housing 210, one surface of the elastic part 411 deformed toward the seating part cover 310 by contact with the electronic pen 490 may be supported by the support part 417 and may be spaced apart from the seating part cover 310. When the electronic pen 490 is completely inserted into the housing 210, the support part 417 may contact the seating part cover 310, protrude from the elastic part 411, and may separate the seating part cover 310 from the elastic part 411. When the electronic pen 490 is removed from the outside of the housing 210, the elastic part 411 may be restored to the original shape of the elastic part 411 by removing the force provided by the electronic pen 490.

According to the above-described embodiment, the elastic part 411 of the cantilever 410 attached to the seating part cover 310 may be spaced apart from the seating part cover 310 by the length of the support part 417 by the support part 417. Even when rotates by inserting a pen, the elastic part 411 may not press the seating part cover 310 by being spaced apart from the seating part cover 310 by the support part 417. The seating part cover 310 may maintain a coupling force with the seating part 330 by reducing external force transmission. Through maintaining the bonding force, the inner space of the housing 210 and the seating part 330 may be isolated from each other by an adhesive member or waterproof tape between the seating part cover 310 and the seating part 330. By separating the seating part 330 from the inner space of the housing 210, the transfer of moisture introduced through the seating part 330 to the inner space of the housing 210 may be reduced.

Figure 9:
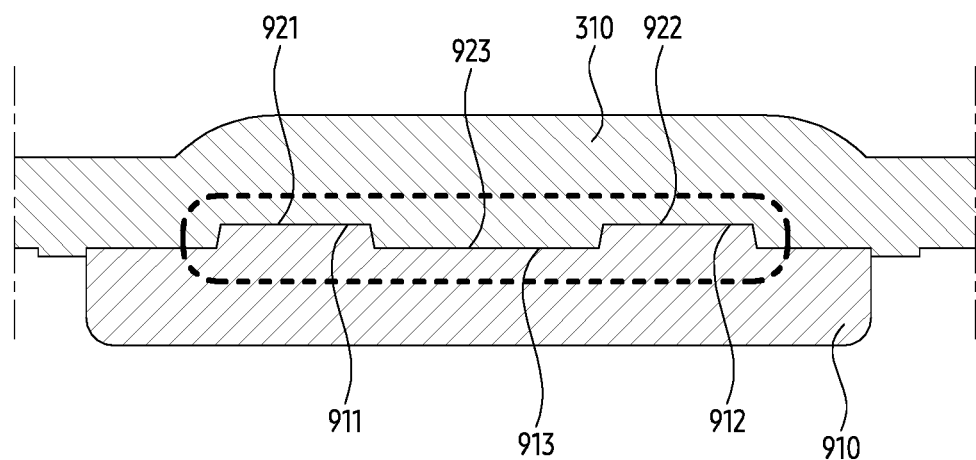
FIG. 9 illustrates an attachment structure of a cover of an electronic device and a heterogeneous material according to an embodiment.

FIG. 9 illustrates an attachment structure of a cover of an electronic device and a heterogeneous material according to an embodiment.

Referring to FIG. 9, the seating part cover 310 may include a structure for strengthening an adhesive force to a component 910 made of a different material (e.g., the cantilever 410 of FIG. 4, the rail part 430, and the holder 450). The seating part cover 310 and the component 910 made of a heterogeneous material may be formed through double injection. The seating part cover 310 may include polycarbonate having rigidity, and the component 910 made of a heterogeneous material may include urethane having elasticity.

In order to reinforce the rigidity of the double-injected bonding surface, the bonding surface of the seating part cover 310 may include concave parts 921 and 922 and convex parts 923 disposed between the concave parts 921 and 922. A bonding surface of the component 910 made of a heterogeneous material may include convex parts 911 and 912 corresponding to concave parts 921 and 922 of the seating part cover 310 and a concave part 913 corresponding to the convex part 923 of the seating part cover 310.

According to an embodiment, irregularities such as a convex portion and a concave portion formed in the double injection bonding portion of the seating part cover 310 and the heterogeneous material component 910 may increase the bonding area and enhance an adhesive force between the seating part cover 310 and the heterogeneous material component 910.

Figure 10:
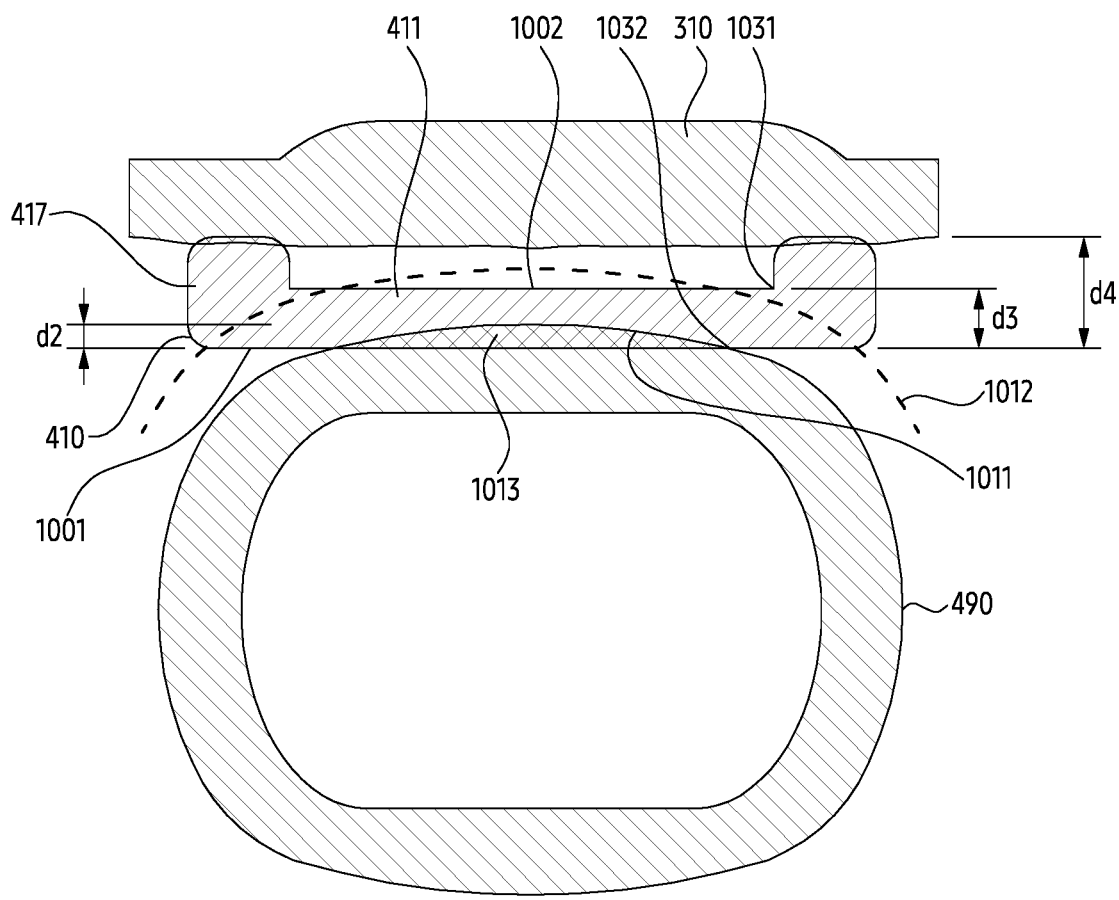
FIG. 10 illustrates an example of an elastic part deformed by contact between an electronic pen and an elastic part, according to an embodiment.
Figure 11:
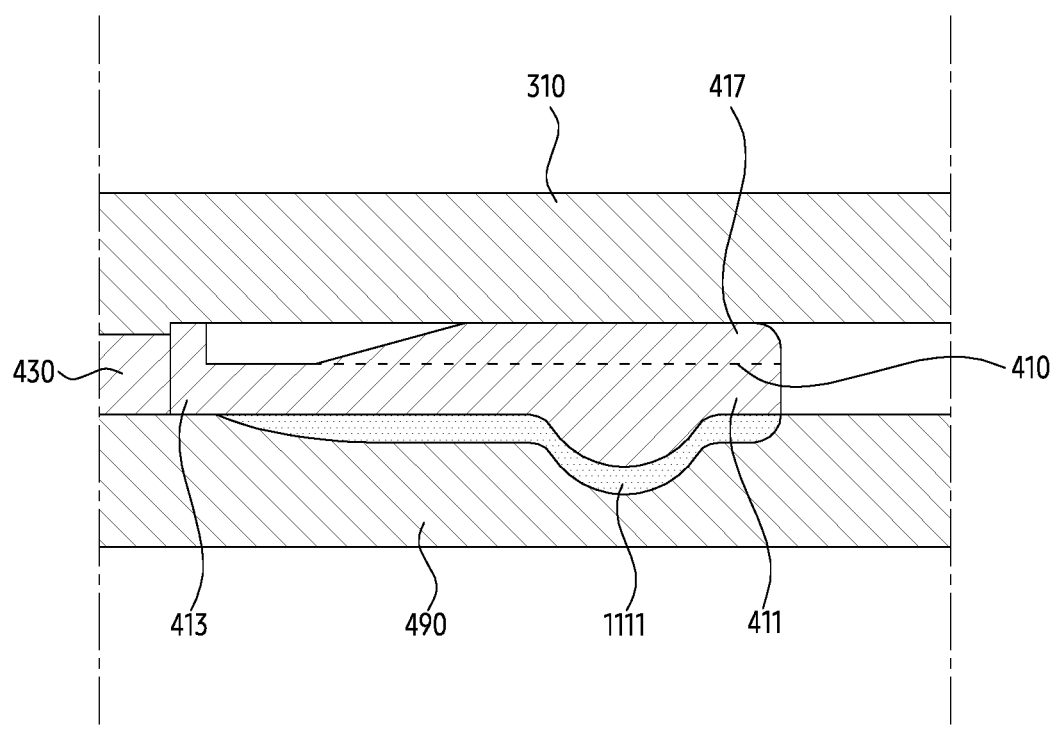
FIG. 11 illustrates an example of an elastic part deformed by contact between an electronic pen and the elastic part, which is viewed from the side of the elastic part according to an embodiment.

FIG. 10 illustrates an example of an elastic part deformed by contact between an electronic pen and an elastic part, according to an embodiment. FIG. 11 illustrates an example of an elastic part deformed by contact between an electronic pen and the elastic part, when viewed from the side of the elastic part according to an embodiment.

The elastic part 411 can have a thickness of d3 when not pressured. When the electronic pen 490 applies force, the thickness d3 can be compressed by d2.

Referring to FIG. 10, when the electronic pen 490 is inserted, the elastic part 411 pressed by the electronic pen 490 may be deformed by pressure from the body of the electronic pen 490. The deformation amount of the elastic part 411 may be d2, and the thickness before deformation of the elastic part 411 may be d3, and the distance from the contact surface of the elastic part 411 with the electronic pen 490 to one surface of the seating part cover 310 facing the elastic part 411 may be d4.

While the electronic pen 490 is removed, the elastic part 411 may have a thickness of d3. The elastic part 411 may be deformed toward the seating part cover 310 by insertion of the electronic pen 490.

When the electronic pen 490 is inserted, the electronic pen 490 may be fixed to the inside of the electronic device 101 by pressing the electronic pen 490 due to the electronic pen 490 and a part of the cantilever 410 in contact and a part of the cantilever 410 in contact with the seating part cover 310. The electronic pen 490 may be in contact with one surface 1001 of the elastic part 411. With the insertion of the electronic pen 490, the electronic pen 490 and the elastic part 411 before deformation may overlap in a partial region 1013. The elastic part 411 may be deformed toward the seating part cover 310 by a portion 1013 overlapping. For example, the elastic part 411 may be deformed by the pressure of the electronic pen 490, the elastic part 411 may be convex in a direction in which the electronic pen 490 presses (e.g., a direction toward the seating part cover 310) by pressing the electronic pen 490. For example, the surface 1001 of the elastic part 411 in contact with the electronic pen 490 may be deformed into a shape corresponding to the external shape of the electronic pen 490 like the surface 1011. The surface 1002 of the elastic part 411 facing the seating part cover 310 may be convexly deformed toward the seating part cover 310 like the surface 1012.

The support part 417 may form a space between the elastic part 411 and the seating part cover 310 even when the elastic part 411 is deformed. For example, the distance of the elastic part 411 deformed by the pressure of the electronic pen 490 may be d2. The maximum distance between the surface (1002) toward the cover of the elastic part 411 and the deformed surface (1012) may be the sum of the deformation distance d2 and the thickness d3 of the elastic part. The sum d4 of the extension distance of the support part 417 located at the periphery of the elastic part 411 and the thickness of the elastic part 411 may be greater than the sum of the deformation distance d2 and the thickness d3 of the elastic part. Since the extension distance of the support part 417 is greater than the deformation distance d2 of the elastic part, the elastic part 411 may maintain a distance from the seating part cover 310 even by pressing the electronic pen 490. The elastic part 411 maintains a separation from the seating part cover 310, thereby preventing a force from being transmitted toward the seating part cover 310.

A distance may be between the point 1031 where the side facing the space where the support 417 is surrounded by the support 417 and the elastic 411 is located and the point on the plane 1002 of the elastic part 411 corresponding to the point 1032 at which the overlapping of the elastic part 411 and the electronic pen 490 occurs. The area overlapping the elastic part 411 and the electronic pen 490 may not overlap the support part 417. Since the region where the support part 417 is located is not directly pressed by the electronic pen 490, even when the electronic pen 490 is pressed, push-up of the cover may be prevented.

Referring to FIG. 11, when the electronic pen 490 is drawn out in a state in which the electronic pen 490 is fastened to the fixing groove 495 of the electronic pen 490 and the fixing protrusion 415 of the elastic part 411, as the fixing groove 495 pushes the fixing protrusion 415, the elastic part 411 may be deformed. The region 1111 in which deformation occurs may be a region pressed by the electronic pen 490 exiting the fixing protrusion 415. The elastic part 411 may be deformed as much as the area 1111 into an internal space surrounded by the elastic part 411 and the support part 417. The thickness of the deformed the area 1111 may be a height of the fixing protrusion 415 or a depth of the fixing groove 495.

Even when the elastic part 411 is deformed by pressing the electronic pen 490 according to the above-described embodiment, the cantilever 410 includes a support part 417 longer than the deformation distance of the elastic part 411, thereby preventing the elastic part 411 from directly pressing the seating part cover 310. By preventing contact of the seating part cover 310 according to the deformation of the elastic part 411 pressed by the electronic pen 490, the seating part cover 310 may be prevented from being separated from the seating part 330. The waterproof performance of the electronic device 101 may be secured by preventing separation from the waterproof tape bonding the seating part cover 310 and the mounting part 330.

Figure 12A:
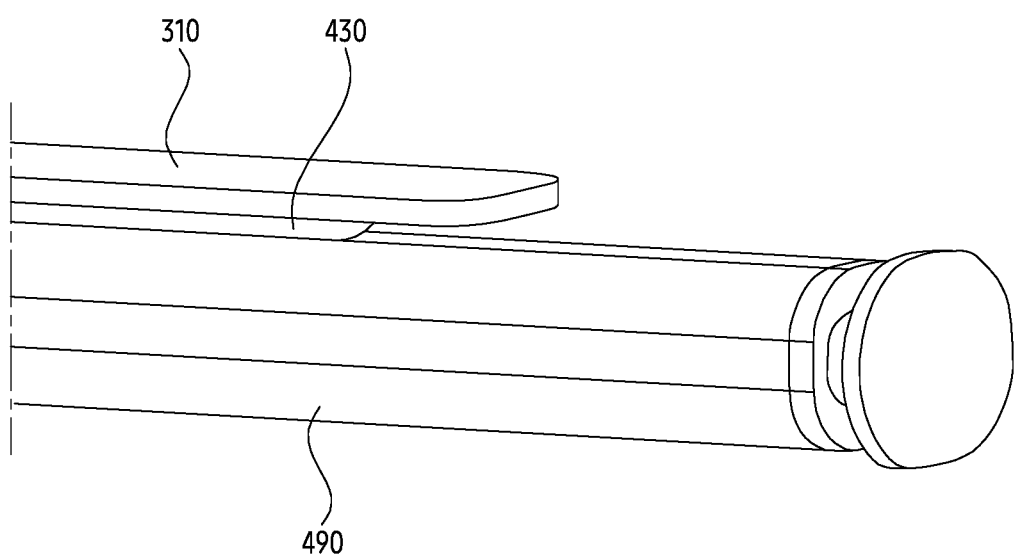
FIGS. 12A and 12B illustrate an example of an arrangement structure of an electronic pen and rail inserted into an electronic device according to an embodiment.
Figure 12B:
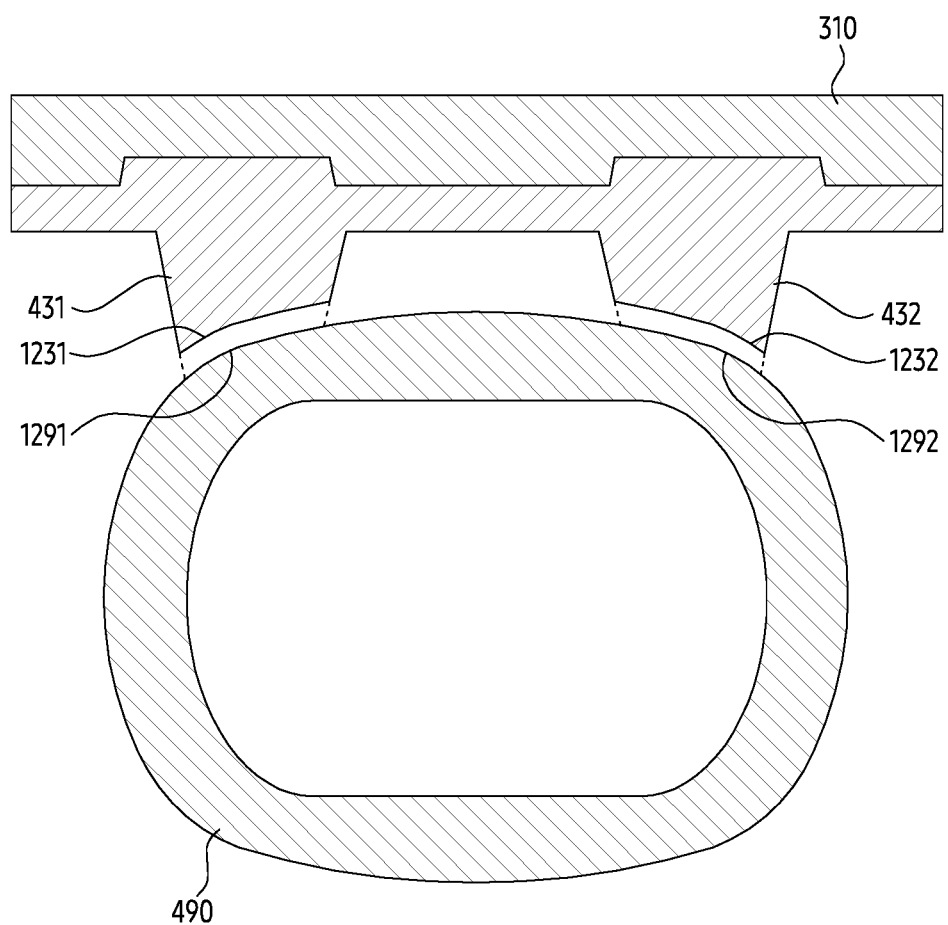

FIGS. 12A and 12B illustrate an example of an arrangement structure of an electronic pen and rail inserted into an electronic device according to an embodiment.

Referring to FIGS. 12A and 12B, the rail part 430 may be formed on a surface of the seating part cover 310 facing the electronic pen 490. The rail part 430 may extend along the longitudinal direction of the seating part cover 310. The rail part 430 may guide the movement of the electronic pen 490 when the electronic pen 490 moves inside the housing (e.g., the housing 210 of FIG. 2). For example, the position of the electronic pen 490 that may deviate from the insertion direction of the electronic pen 490 may be guided to a designated position.

The rail part 430 may be formed of an elastic urethane or rubber material. This reduces the occurrence of scratches on the surface of the electronic pen 490. The rail part 430 may be formed by being coupled to the seating part cover 310 through double injection.

When the electronic pen 490 is fully inserted into the housing, the rail portion 430 may be spaced apart from the electronic pen. When inserted into the housing 210 along the rail portion 430, the electronic pen 490 may move while partially in contact with the rail portion 430. When the electronic pen 490 is fully inserted into the housing 210, the electronic pen 490 may be spaced apart from the rail portion 430 by an interval.

The rail part 430 may support a part of the electronic pen 490 and include the first rail 431, the second rail 432 spaced apart from the first rail 431 and supporting the remaining portion of the electronic pen 490.

The first rail 431 and the second rail 432 may be spaced apart from the periphery of the seating part cover 310. The distance between the first rail 431 and one periphery of the longitudinal peripheries of the seating part cover 310 may be the same as the distance between the second rail 432 and the other periphery of the longitudinal direction of the seating part cover 310. In the above-described arrangement of the first rail 431 and the second rail 432, when the electronic pen 490 is inserted into the housing 210 or removed from the inside, the first rail 431 and the second rail 432 may guide the electronic pen 490 in place.

A cross section of the first rail 431 may be similar to a cross section of the second rail 432. For example, the cross section of the first rail 431 and the cross section of the second rail 432 may be symmetrical. The cross section of the first rail 431 may be linearly symmetrical to the cross section of the second rail 432 with respect to a virtual or imaginary line passing through a space between the first rail 431 and the second rail 432.

The first rail 431 and the second rail 432 may have an offset shape from the outer surface of the electronic pen 490. For example, the shape of the portion of the first rail 431 spaced apart from the outer surface of the electronic pen 490 and disposed along the outer surface of the electronic pen 490 may correspond to the shape of the outer surface of the electronic pen 490 and the shape of the portion of the second rail 432 spaced apart from the outer surface of the electronic pen 490 and disposed along the outer surface of the electronic pen 490 may correspond to the shape of the outer surface of the electronic pen 490.

The first rail 431 and the second rail 432 formed in a shape corresponding to a part of the electronic pen 490 may stably guide the electronic pen 490 to the inner space of the housing 210 by determining the position of the electronic pen 490. The first rail 431 and the second rail 432 may have a shape corresponding to at least half of the curved surface formed in the corner region of the electronic pen 490 in order to stably guide the positions of the electronic pen 490.

According to the above-described embodiment, the electronic device may reduce defects that may occur in the electronic pen 490 by forming the rail 430, the cantilever 410, and the holder 450 formed inside the seating part 330 as urethane.

Figure 13:
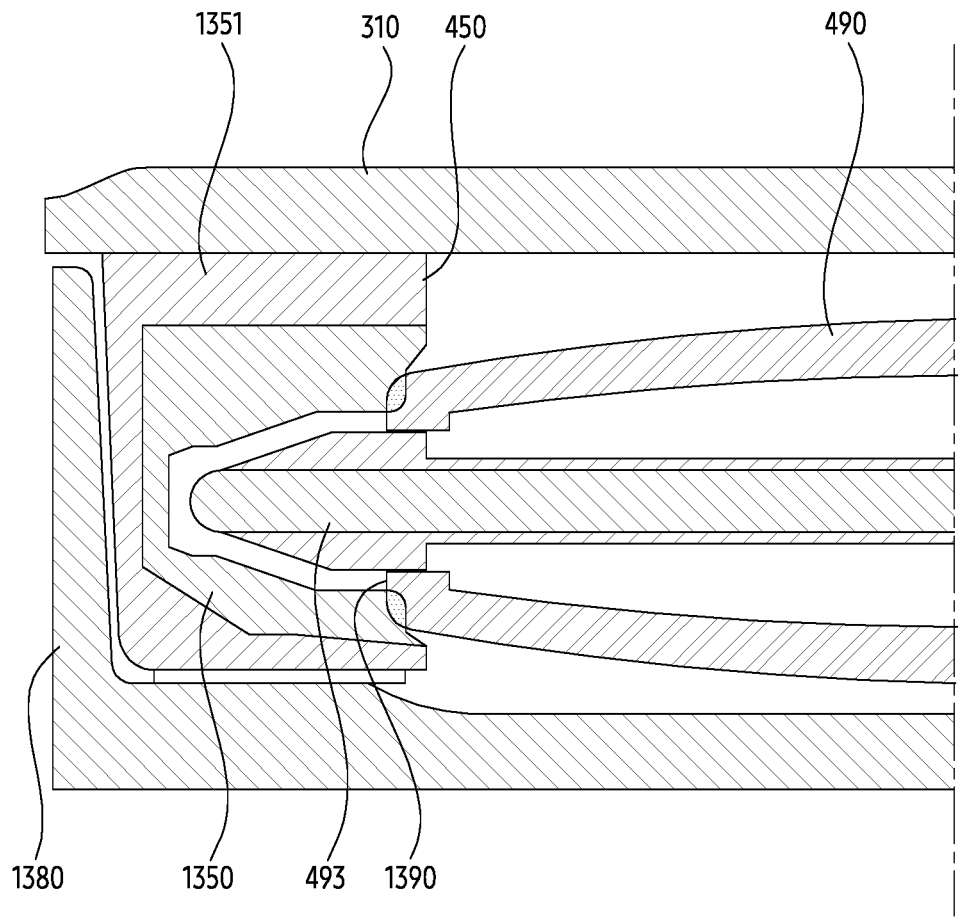
FIG. 13 illustrates an example of an arrangement structure of a cover, a holder, and an internal device of an electronic device, according to an embodiment.

FIG. 13 illustrates an example of an arrangement structure of a cover, a holder, and an internal device of an electronic device, according to an embodiment.

The electronic device (e.g., the electronic device 101 of FIG. 1) may further include a holder 450. The holder 450 may support the electronic pen 490 by accommodating a part of one end 1390 of the electronic pen 490 when the electronic pen 490 is fully inserted into the housing (e.g., the housing 210 of FIG. 2). For example, since the electronic pen 490 is in contact with the holder 450 when the electronic pen 490 is completely inserted into the housing 210, it may be difficult to proceed with the electronic pen 490 in the insertion direction any more. The holder 450 may be seated at a designated position of the seating part cover 310 to induce the electronic pen 490 to be stably inserted into the correct position. The fixed position may be that the electronic pen 490 is spaced apart from the seating part by a designated distance. For example, the electronic pen 490 may be spaced apart from the seating part by a designated distance and may be spaced apart from the seating part cover 310 by a different distance distinguished from the designated distance. The electronic pen 490 may be spaced apart from a periphery of the through hole (e.g., the through hole 370 of FIG. 2). The center of the cross section of the electronic pen 490 may coincide with the center of the cross section of the through hole 370.

The holder 450 may include a space in which the pen tip 493 is accommodated. The holder 450 may protect the pen tip 493 through the accommodation of the pen tip 493 and may align the position of the electronic pen 490 in a correct position around the pen tip 493.

The holder 450 frequently contacts one end of the electronic pen 490, and may function as a protective cushion to reduce damage to the electronic pen 490 when contacting the electronic pen 490. The cantilever (e.g., the cantilever 410 of FIG. 4) and the holder 450 may include urethane and may be spaced apart. The cantilever 410 and the holder 450 may be formed of urethane or rubber, which is the same material, through double injection. The holder 450 may be spaced apart from the cantilever 410 in the insertion direction of the electronic pen 490.

The holder 450 may be partially formed of an elastic material such as urethane or rubber, and the rest may be formed of a polycarbonate material having rigidity. For example, the holder 450 may be formed of an elastic material for a portion into which the pen tip 493 of the electronic pen 490 is inserted, a portion 1350 overlapping the pen tip 493, and a portion in contact with electronic pen 490 and the portion 1351 in contact with the instrument 1380 may be formed of a material having rigidity.

The portion 1351 in contact with the instrument 1380 may be formed by injection to have rigidity, and the portion 1351 in contact with the instrument 1380 of the holder 450 may be configured to be well seated on the seating part 330 formed of the instrument 1380.

The holder 450, the rail 430, and the cantilever 410 may be formed of an elastic material such as urethane or rubber to protect the electronic pen 490. The holder 450 formed of the elastic member may reduce damage to the pen tip 493 by contacting the pen tip 493 of the electronic pen 490.

Figure 14A:
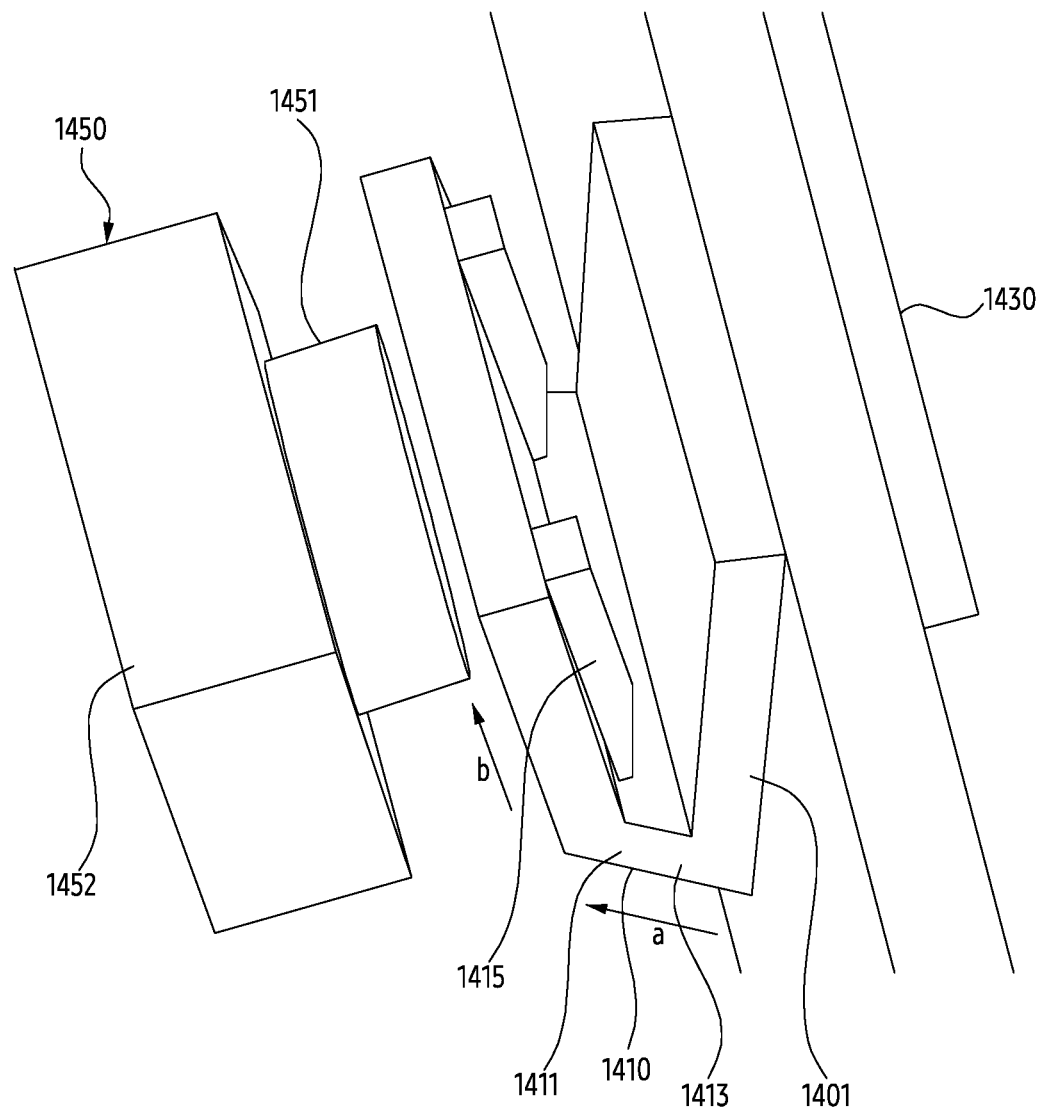
FIG. 14A illustrates an example of an arrangement structure of a cantilever structure and other components inside an electronic device to which the cantilever structure is applied, according to an embodiment.
Figure 14B:
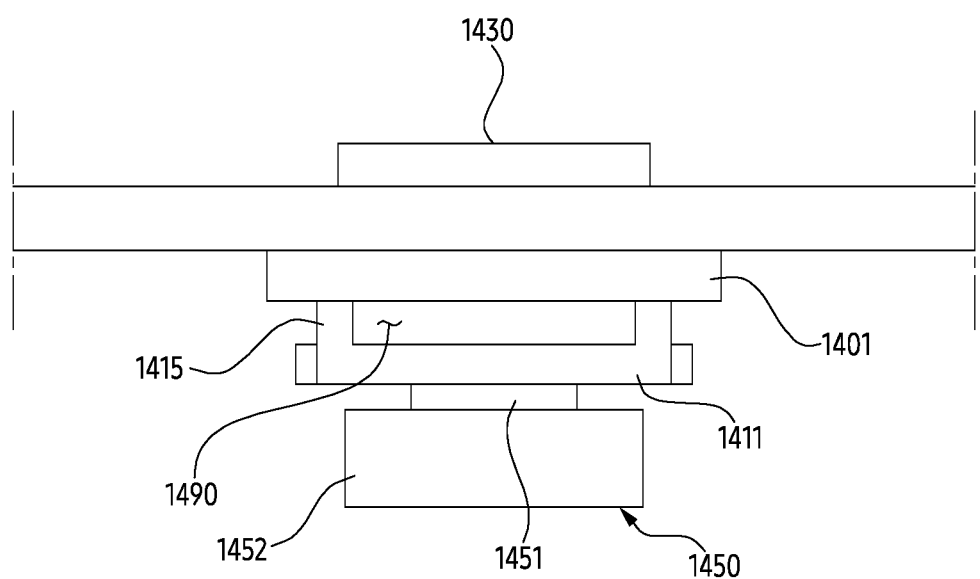
FIG. 14B is a front view of a cantilever structure for applying force an electronic component according to an embodiment.

According to an embodiment, FIG. 14A illustrates an example of another component inside the electronic device to which the cantilever structure is applied and example of arrangement structure of cantilever structure, and FIG. 14B is a front view of an cantilever structure for pressing an electronic component according to an embodiment.

Referring to FIGS. 14A and 14B, an electronic device 1400 may include a cantilever structure 1410 and a component 1450. In certain embodiments, the component 1450 can be an electronic pen. In other embodiments, the component 1450 can be different. The cantilever structure 1410 is fastened to the base 1401, and one end may be restricted, and the other end may be free. The cantilever structure 1410 may include a base 1401, a connection part 1413, an elastic part 1411, and a support part 1415. The cantilever structure 1410 may be referred to as a pocket clip. The cantilever structure 1410 may have a horseshoe shape and may have a pocket clip shape partially having elasticity.

The cantilever structure 1410 may be in contact or non-contact with the electronic device (e.g., the electronic device 101 of FIG. 1) due to a movement of the electronic component 1450 disposed inside the electronic device. A part of the electronic component 1450 may perform a linear motion, and through the linear motion, the electronic component 1450 may contact and non-contact with the cantilever structure 1410 may occur. The elastic portion 1411 of the cantilever structure 1410 may contact the protrusion 1451 of the electronic component 1450. The electronic component 1450 may be disposed in a direction facing one surface of the elastic portion 1411. However, the present invention is not limited thereto, and the electronic component 1450 may be spaced apart from the elastic part 1411 and disposed to face the connecting part 1413, and a portion of the electronic component may linearly move and contact the elastic part 1411.

The base 1401 may be disposed in the housing 210. The housing 210 may include a support member (e.g., a bracket), and the base 1401 may be disposed on the support member. The support member may support the cantilever structure 1410 by supporting the base 1401.

The connection part 1413 may extend in the first direction a from one surface of the base 1401. The connection part 1413 may connect the base 1401 to the elastic part 1411 and elastically support the elastic part 1411. The connection part 1413 may constrain one end of the elastic part 1411. For example, one end of the elastic part 1411 may be supported by the connection part 1413, and the other end of the elastic part 1411 may be a free end.

The elastic portion 1411 may extend from the connection portion 1413 to have a distance from the base 1401 along a second direction b distinguished from the first direction a. The elastic portion 1411 may be formed of a material having elasticity. For example, the elastic portion 1411 may be formed of a urethane or rubber material. The entire cantilever structure 1410 including the elastic portion 1411 may be formed of urethane or rubber material. The elastic part 1411 presses the component, and accordingly, the surface forming the elastic part 1411 may be convexly deformed toward the base by elasticity.

The support part 1415 may extend along a periphery away from the connection part 1413 among peripheries of the elastic part 1411. The support part 1415 may protrude toward the base 1401 from a surface facing the base 1401 among surfaces of the elastic part 1411. The support part 1415 may be formed in two and extend along peripheries of the elastic part 1411 that are in contact with peripheries facing the connection part 1413.

The support part 1415 may contact the support part 1415 while the component 1450 and the elastic part 1411 in the electronic device 101 are in contact with each other to apply force to the component 1450. As the component 1450 contacts the elastic portion 1411, one surface of the elastic portion 1411 deformed toward the base 1401 may be in contact with the base 1401 and may be spaced apart from the base 1401 by a support portion 1415 protruding from the elastic portion 1411.

When the elastic part 1411 presses the component 1450, the support part 1415 may form an empty space 1490 surrounding the elastic part 1411 and the base 1401.

The base 1401 may be integrally formed with the key button 1430 exposed to the outside through an opening formed in the housing 201. The key button 1430 may be exposed to the outside of electronic device 101 to provide an input from the outside. The key button 1430 may press the base 1401 toward the component 1450 by a force pressed from the outside, and the pressed cantilever structure 1410 may move toward the component 1450. A part of the structure of the cantilever 1410 may be in contact with the protrusion 1451 of the component 1450. For example, the elastic portion 1411 may be in contact with the protrusion portion 1451. The elastic part 1411 may move toward the base 1401 by bonding with the protrusion part 1451, may be supported by the support part 1415 while moving toward the base, and may press the protrusion part 1451 by the support. The component 1450 may include a body 1452 and a protrusion 1451 protruding from the body 1452. The protrusion part 1451 may be inserted into the body 1452 by an external force by a predetermined distance, and may be exposed to the outside when the external force is removed.

The component 1450 may be a tag switch, and the elastic portion 1411 of the cantilever structure 1410 may press the tag switch by clicking the key button 1430. The component 1450 may perform a designated function by pressing the tag switch.

When the component 1450 is a tack switch, the click feeling of the key button may be different according to manufacturing tolerances. When the tag switch is biased toward the base 1401, a click may always occur, or it may not be easy for a user to recognize whether a click is made when clicking. According to an embodiment, the cantilever 1410 may include an elastic space surrounded by the elastic part 1411 and the support part 1415, thereby improving a click sensation. When the tag switch of the component 1450 is disposed farther than normal from the base 1401, even when the user clicks the key button 1430, there may be a problem that the tag switch of the component 1450 is not pressed by the pad 1451. According to an embodiment, as the cantilever 1410 moves away from the connection part 1413, the cantilever 1410 may arrange the elastic portion 1411 away from the base 1401, thereby causing contact with the pad 1451 of the tag switch, which is a component 1450 and an input may be provided to the tag switch by pressing the key button 1430.

Figure 15:
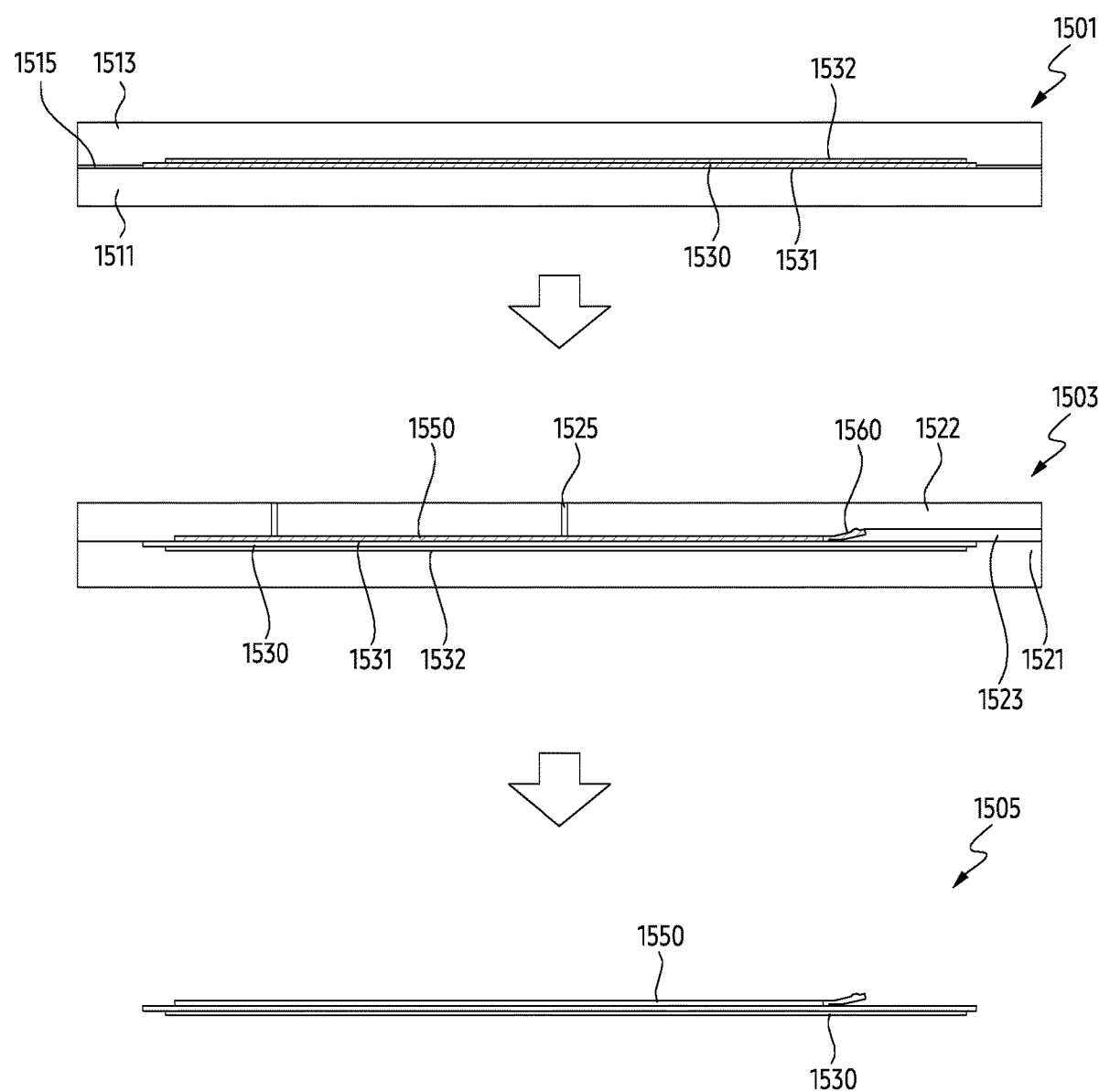
FIG. 15 illustrates a process of manufacturing a cover, according to an embodiment.

FIG. 15 illustrates a process of manufacturing a cover, according to an embodiment.

Referring to FIG. 15, in process 1501, a first lower mold 1511 and a first upper mold 1513 may be prepared. The first lower mold 1511 and the first upper mold 1513 may be formed in a shape corresponding to a portion of the product formed of the first material.

According to an embodiment, the manufactured product may include a cover 1530 formed of a first material having rigidity, a rail 1550 formed of a material distinguished from the first material and a cantilever 1560.

The first lower mold (1511) and the first upper mold (1513) may be disposed to face each other, and a molten material may be injected through a gate (1515) formed in the molds. The material may be a polycarbonate for forming the cover 1530.

The injection product formed through the first lower mold (1511) and the first upper mold (1513) may be double injection-molded to form parts of different materials by bonding.

In step 1503, the first surface 1531 of the cover 1530 may be disposed to face upward, and the second surface 1532 may be disposed to face downward. The second surface 1532 of the cover 1530 may be disposed to be in contact with the second lower mold 1521 and the second upper mold 1522 may be disposed to be in contact with the first surface 1531. An intermediate mold 1523 may be disposed between the second upper mold 1522 and the second lower mold 1521. The intermediate mold 1523 may have a shape corresponding to the shape of the cantilever in order to manufacture the shape of the cantilever 1560. The second upper mold 1522 may be formed in a shape corresponding to the shape of the rail 1550. The second upper mold 1522 may include a gate 1525 into which a material may be injected.

Urethane or rubber, which is an elastic material of the rail 1550 and the cantilever 1560, may be injected through the gate 1525. The elastic material injected through the gate 1525 may be hardened inside the mold to form the rail 1550 and the cantilever 1560.

In step 1505, the mold may be removed, and the finished product may be washed.

According to an embodiment, the cover 1530 may manufacture a product in a form in which the rail 1550 and the cantilever 1560 are bonded through double injection. Using the intermediate mold 1523, a structure extending while being spaced apart from the cover 1530 may be manufactured, such as the cantilever 1560.

According to the above-described embodiment, the cantilever 1560 may be formed in consideration of the thickness of the mold, may enable double injection, and may have a structure capable of fixing the electronic pen 490 inserted into the electronic device 101. The cantilever 1560 may function as a locker capable of fixing the position of the electronic pen 490. In order to provide a locker, an opening may be formed in an instrument to which the cover 1530 is attached. The formed opening may degrade the waterproof performance of the electronic device 101. According to an embodiment, the cover 1530, the rail 1550, and the cantilever 1560 formed through double injection are integrally formed, and thus a separate opening is not required for an instrument, and the electronic device 101 may ensure waterproof performance.

According to the above-described embodiment, electronic device (e.g., the electronic device 101 of FIG. 1) may comprise a housing (e.g., housing 210 of FIG. 4) including a through hole (e.g., the through hole 370 of FIG. 4) formed outside of the housing and a seating part connected to the through hole, the seating part accommodating insertion of an electronic pen (e.g., the electronic pen 490 of FIG. 4) through the through hole, a seating part cover surrounding at least of a part of the seating part (e.g., the seating part 330 of FIG. 4), a cantilever disposed in the seating part, the cantilever including an elastic part extending to have a distance from the cover (e.g., the seating part cover 310 of FIG. 4) that increases along the insertion direction of the electronic pen; wherein the cantilever (e.g., the cantilever 410 of FIG. 4) may include a connection part (e.g., connecting part 413 of FIG. 7) connecting the seating part cover and the elastic part (e.g., the elastic part 411 of FIG. 6) and a support part (e.g., support part 417 of FIG. 6) protruding from one surface of the elastic part facing the seating part cover and extending in a direction away from the connection part.

While the electronic pen is inserted into the housing, within a state of being supported by one surface of the cover in contact with a part of the cantilever, by pressing the electronic pen through another part of the cantilever in contact with the electronic pen, it may be configured to fix the electronic pen inserted into the housing.

According to an embodiment, the support part may be configured to be in contact with the seating part cover and to support the elastic part, wherein the electronic pen applies force to the elastic part when the electronic pen is inside the housing.

According to an embodiment, when the electronic pen is fully inserted into the housing, one surface of the elastic part which is deformed toward the seating part cover by the force from the electronic pen may be in contact with the seating part cover and may be spaced apart from the seating part cover by the support part.

According to an embodiment, the electronic device may further comprise a rail part extending from the through hole to the connection part on the seating part cover and configured to guide the insertion of the electronic pen; and wherein the rail part may be connected to prevent the cantilever from moving in a moving when the electronic pen moves.

According to an embodiment, when the electronic pen may be fully inserted into the housing, the rail part may be spaced apart from the electronic pen.

According to an embodiment, the rail part may include a first rail (e.g., the first rail 431 of FIG. 5) configured to support one part of the electronic pen and a second rail (e.g., the second rail 432 of FIG. 5) spaced from the first rail and configured to support another part of the electronic pen, and a cross-section of the first rail may be line symmetric with a cross-section of the second rail with respect to a line passing through a space between the first rail and the second rail.

According to an embodiment, a shape of a portion of the first rail spaced apart from an outer surface of the electronic pen and disposed along the outer surface of the electronic pen may correspond to a shape of the outer surface of the electronic pen.

According to an embodiment, the cantilever and the rail part may include urethane and may be integrally formed.

According to an embodiment, the support part may be fully in contact with the seating part cover where the electronic pen is inserted.

According to an embodiment, the cantilever may include a fixing protrusion (e.g., fixing protrusion 415 of FIG. 6) formed on a surface of the elastic part facing the seating part and configured to insert into a fixing groove (For example, the fixing groove 495 of FIG. 6) of the electronic pen, when the electronic pen is fully inserted into the housing.

According to an embodiment, the fixing protrusion may be in contact with a second region (e.g., the second region 492 of FIG. 4), among a first region (e.g., the first region 491 of FIG. 4) extended from a part of an outer surface of the electronic pen having the first cross sectional area to another end of the outer surface of the electronic device having the second cross sectional area and the second region extending to another of the electronic pen.

According to an embodiment, the electronic device may further comprise a holder (e.g., the holder 450 of FIG. 4) for supporting the electronic pen by accommodating a portion of one end of the electronic pen, when the electronic pen is fully inserted into the housing.

According to an embodiment, the cantilever and the holder may include urethane, and spaced apart from each other.

According to an embodiment, one surface of the seating part cover disposed between the seating part and one surface of the holder facing another surface of the holder in contact with the electronic pen may be configured to fasten the holder to the seating part.

According to an embodiment, a waterproof tape (e.g., the adhesive member 350 of FIG. 3) disposed along a periphery of the seating part cover may isolate the seating part of the seating part cover from the inner space of the housing.

According to an embodiment, an entire attachment surface of the waterproof tape may be attached to the seating part and the seating part cover.

According to an embodiment, an electronic device (e.g., the electronic device 1400 of FIG. 14A) may comprise a housing (e.g., housing 210 of FIG. 14A), a component in the housing (e.g., the component 1450 of FIG. 14A), a base in the housing (e.g., base 1401 of FIG. 14A), a connection part (e.g., connection part 1413 of FIG. 14A) extending from one surface of the base in a first direction, an elastic part (e.g., the elastic portion 1411 of FIG. 14A) extending from the connecting part to have a distance from the base along a second direction distinct from the first direction and a support part (e.g., support part 1415 of FIG. 14A) protruding from one surface of the elastic part toward the base; wherein the support part may contact the base to apply a force to the component (e.g., the component 1450 of FIG. 14A), when the component and the elastic part are in contact.

According to an embodiment, one surface of the elastic part, deformed toward the base, by a component contacting the elastic part may be spaced apart from the base, by the support part, and the elastic part, the support part and the base may form an empty space.

According to an embodiment, the component comprises an electronic pen, and the electronic device may further comprise a seating part (e.g., the seating part 330 of FIG. 4) enclosing a space in which the electronic pen (e.g., the electronic pen 490 of FIG. 4) is accommodated together with the base.

According to an embodiment, the base may be integrally formed with a key button (e.g., a key button 1430 of FIG. 14a) exposed to an outside through an opening formed in the housing, and the cantilever may press a component tact switch by clicking the key button. The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may be interchangeably used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Certain embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to certain embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments of the disclosure, each component (e.g., a module or a program) of the above-described components may include a single entity or multiple entities, and some of the multiple entities may be separately disposed in different components. According to certain embodiments of the disclosure, one or more of the above-described components may be omitted, or one or more other components may be added. Alternatively or additionally, a plurality of components (e.g., modules or programs) may be integrated into a single component. In such a case, according to certain embodiments of the disclosure, the integrated component may still perform one or more functions of each of the plurality of components in the same or similar manner as they are performed by a corresponding one of the plurality of components before the integration. According to certain embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to certain embodiments thereof, it will be understood by those skilled in the art that various changes in form and details may be made therein without departing from the spirit and scope of the disclosure as defined by the appended claims and their equivalents.

What is claimed is:

1. An electronic device comprising:
a housing including a through hole visible from outside of the housing, and a seating part connected to the through hole, the seating part configured to accommodate an electronic pen inserted through the through hole;
a seating part cover in the housing surrounding at least of a part of the seating part; and
a cantilever, adhered to the seating part cover, in the seating part including a connection part having a fixed end of the cantilever and an elastic part having a free end of the cantilever and extended from the connection part, and a support part disposed on opposite edges of the elastic part, protruding from the elastic part towards the seating part cover, wherein the opposite edges are along an insertion direction of the electronic pen;
wherein the fixed end of the cantilever is fixed to the seating part cover, and
wherein the fixed end of the cantilever is closer to the through hole than the free end of the cantilever.

2. The electronic device, according to claim 1,
wherein the support part is configured to be in contact with the seating part cover by the electronic pen and to support the elastic part and forms empty space between the elastic part and the seating part cover for the elastic part to be deformed by the electronic pen when the electronic pen is inside the housing.

3. The electronic device, according to claim 2, wherein when the electronic pen is fully inserted into the housing, one surface of the elastic part which is deformed toward the seating part cover by a force from the electronic pen is in contact with the seating part cover and is spaced apart from the seating part cover by the support part.

4. The electronic device, according to claim 2, further comprising:
a rail part extending from the through hole to the connection part on the seating part cover and configured to guide insertion of the electronic pen; and
wherein the rail part is configured to prevent the cantilever from moving when the electronic pen moves inside the housing.

5. The electronic device, according to claim 4,
wherein, when the electronic pen is fully inserted into the housing, the rail part is spaced apart from the electronic pen.

6. The electronic device, according to claim 4,
wherein the rail part and includes a first rail configured to support one part of the electronic pen and a second rail spaced from the first rail and configured to support another part of the electronic pen, and
wherein a cross-section of the first rail is line symmetric with a cross-section of the second rail with respect to an imaginary line passing through a space between the first rail and the second rail.

7. The electronic device, according to claim 6, wherein a shape of a portion of the first rail spaced apart from an outer surface of the electronic pen and disposed along the outer surface of the electronic pen corresponds to a shape of the outer surface of the electronic pen.

8. The electronic device, according to claim 4, wherein the cantilever and the rail part include urethane and are integrally formed.

9. The electronic device, according to claim 2, wherein the support part is fully in contact with the seating part cover where the electronic pen is inserted.

10. The electronic device, according to claim 1, wherein the cantilever includes a fixing protrusion formed on a surface of the elastic part facing the seating part and configured to insert into a fixing groove of the electronic pen, when the electronic pen is fully inserted into the housing, and
wherein the fixing protrusion is in contact with a second region, among a first region extended from a part of an outer surface of the electronic pen having a first cross sectional area to another end of the outer surface of the electronic device having a second cross sectional area and the second region extending to another of the electronic pen.

11. An electronic device comprising: a housing including a through hole formed visible from outside of the housing, and a seating part connected to the through hole, and the seating part configured to accommodate insertion of an electronic pen inserted through the through hole;
a seating part cover surrounding at least of a part of the seating part; and
a cantilever, adhered to the seating part cover, toward the seating part, the cantilever including a connection part fixed to the seating part cover and an elastic part extended from the connection part along a direction in which the electronic pen is inserted, and a support part disposed on opposite edges of the elastic part, protruding from the elastic part towards the seating part cover, wherein the opposite edges are along an insertion direction of the electronic pen;
wherein the elastic part is configured to be contacted with the electronic pen after the electronic pen inserted through the through hole is moved across over the connection part.

12. The electronic device, according to claim 11, further comprising:
a holder for supporting the electronic pen by accommodating a portion of one end of the electronic pen, when the electronic pen is fully inserted into the housing.

13. The electronic device, according to claim 12, wherein the cantilever and the holder, include urethane, and are spaced apart from each other and wherein a surface of the seating part cover is configured to fasten the holder to the seating part.

14. The electronic device, according to claim 11, further comprising:

a rail part extending from the through hole to the connection part on the seating part cover and configured to guide insertion of the electronic pen.

15. The electronic device, according to claim 11, further comprising:

a waterproof tape disposed between the seating part cover and the seating part along an edge of the seating part cover, and wherein the waterproof tape reduces inflow of moisture into an inner space of the housing through the seating part and isolates the inner space of the housing from the seating part.

16. The electronic device, according to claim 15, wherein an entire attachment surface of the waterproof tape is attached to the seating part and the seating part cover.

17. An electronic device, comprising:

a housing;

a key button disposed on a surface of the housing;

a component in the housing; and a cantilever, the cantilever including:

a base in the housing, the base fixed to the key button;

a connection part extending from one surface of the base in a first direction;

an elastic part extending from the connection part to have a distance from the base along a second direction different from the first direction; and a support part protruding from opposite edges of one surface of the elastic part toward the base;

wherein pressing of the key button causes the support part to contact the base to apply a force to the component, and the elastic part to contact the component.

18. The electronic device, according to claim 17, wherein one surface of the elastic part deforms toward the base, by a component contacting the elastic part is spaced apart from the base, by the support part, and wherein the elastic part, the support part and the base form an empty space.

19. The electronic device, according to claim 17, wherein the component comprises an electronic pen, the electronic device further comprising:

a seating part enclosing a space in which the electronic pen is accommodated together with the base.

* * * * *